(12) United States Patent
Sugiyama et al.

(10) Patent No.: US 9,884,760 B2
(45) Date of Patent: Feb. 6, 2018

(54) HYDROGEN GENERATION APPARATUS

(71) Applicant: Bio Coke Lab. Co., Ltd., Tokyo (JP)

(72) Inventors: Takashi Sugiyama, Yokohama (JP); Hiroshi Uesugi, Yokohama (JP)

(73) Assignee: Bio Coke Lab. Co., Ltd., Tokyo (JP)

( * ) Notice: Subject to any disclaimer, the term of this patent is extended or adjusted under 35 U.S.C. 154(b) by 130 days.

(21) Appl. No.: 14/407,411

(22) PCT Filed: May 29, 2013

(86) PCT No.: PCT/JP2013/064944
§ 371 (c)(1),
(2) Date: Dec. 11, 2014

(87) PCT Pub. No.: WO2013/190966
PCT Pub. Date: Dec. 27, 2013

(65) Prior Publication Data
US 2015/0125348 A1     May 7, 2015

(30) Foreign Application Priority Data

Jun. 19, 2012  (JP) .................................. 2012-138091

(51) Int. Cl.
*C01B 3/06*     (2006.01)
*B01J 19/00*    (2006.01)

(52) U.S. Cl.
CPC ........... *C01B 3/065* (2013.01); *B01J 19/0006* (2013.01); *B01J 19/0013* (2013.01);
(Continued)

(58) Field of Classification Search
CPC combination set(s) only.
See application file for complete search history.

(56) References Cited

U.S. PATENT DOCUMENTS 4,343,770 A * 8/1982 Simons .................. B01D 53/02
                                            123/DIG. 12
6,593,017 B1 * 7/2003 Tan .......................... C01B 3/065
                                            252/188.26
(Continued)

FOREIGN PATENT DOCUMENTS

CN      201116279 Y      9/2008
CN      201217634 Y      4/2009
(Continued)

OTHER PUBLICATIONS

Extended European Search Report dated Apr. 15, 2016 for co-pending European Patent Application No. 13807413.3, 7 pages.

*Primary Examiner* — Kaity Chandler
(74) *Attorney, Agent, or Firm* — Rudy J. Ng; Bret E. Field; Bozicevic, Field & Francis LLP

(57) ABSTRACT

The apparatus includes: a hydrogen generation container provided with a magnesium-based hydride accommodation part accommodating magnesium-based hydride; a reaction water tank storing water or an aqueous solution; the pipes connected to the reaction water tank and the hydrogen generation container; a pump operating to suction water or the aqueous solution from the reaction water tank and then exhaust it through the pipes to the hydrogen generation container; a pressure gauge measuring the pressure in the inside of the hydrogen generation container; and a control unit, on the basis of the pressure value of the pressure gauge, controlling the amount of water caused to flow through the pipes by the pump.

12 Claims, 16 Drawing Sheets

(52) U.S. Cl.
CPC .......... *B01J 2219/00094* (2013.01); *B01J 2219/00164* (2013.01); *C01B 2203/16* (2013.01); *Y02E 60/362* (2013.01)

(56) References Cited

U.S. PATENT DOCUMENTS

| | | | | |
|---|---|---|---|---|
| 7,938,077 | B1* | 5/2011 | Dunn | B63G 8/08 114/20.2 |
| 2002/0025462 | A1* | 2/2002 | Nakanishi | C01B 3/04 205/343 |
| 2002/0056715 | A1* | 5/2002 | Fujita | F17C 5/06 220/581 |
| 2003/0009942 | A1* | 1/2003 | Amendola | B01J 8/0207 48/61 |
| 2003/0037487 | A1* | 2/2003 | Amendola | B01J 8/0242 48/76 |
| 2003/0091876 | A1* | 5/2003 | Rusta-Sellehy | C01B 3/065 429/421 |
| 2003/0091879 | A1* | 5/2003 | Rusta-Sellehy | C01B 3/065 429/411 |
| 2003/0118145 | A1* | 6/2003 | Faris | C01B 3/065 376/268 |
| 2005/0175868 | A1* | 8/2005 | McClaine | C01B 3/065 422/236 |
| 2006/0225350 | A1* | 10/2006 | Spallone | B01J 7/02 48/198.2 |
| 2006/0269470 | A1 | 11/2006 | Zhang et al. | |
| 2007/0227899 | A1* | 10/2007 | McClaine | C01B 3/0005 205/637 |
| 2008/0016884 | A1* | 1/2008 | Kesten | F17C 5/04 62/47.1 |
| 2008/0026269 | A1* | 1/2008 | Shurtleff | H01M 8/04007 429/414 |
| 2008/0115362 | A1* | 5/2008 | Toh | C01B 3/0005 29/890.121 |
| 2009/0304558 | A1* | 12/2009 | Patton | B01J 7/02 422/148 |
| 2011/0194992 | A1* | 8/2011 | Barton | B01J 7/02 422/239 |
| 2011/0286913 | A1* | 11/2011 | Lugtigheid | C01B 3/065 423/658.2 |
| 2012/0201719 | A1 | 8/2012 | Jehan et al. | |

FOREIGN PATENT DOCUMENTS

| | | |
|---|---|---|
| CN | 101568487 A | 10/2009 |
| CN | 101633492 A | 1/2010 |
| CN | 202089762 U | 12/2011 |
| JP | S54-121292 A | 9/1979 |
| JP | 2000-249425 | 9/2000 |
| JP | 2002-134141 | 5/2002 |
| JP | 2002-137903 | 5/2002 |
| JP | 2006-298670 | 11/2006 |
| JP | 2007-176713 | 7/2007 |
| JP | 2010-244881 | 10/2010 |
| WO | WO 98/30493 A2 | 7/1998 |
| WO | WO 2009/015328 A1 | 1/2009 |
| WO | WO2011033192 A1 | 3/2011 |

* cited by examiner

HYDROGEN GENERATION APPARATUS

This application is the national phase under 35 U.S.C. § 371 of PCT International Application No. PCT/JP2013/064944 which has an International filing date of May 29, 2013 and designated the United States of America.

BACKGROUND

1. Technical Field

The present invention relates to an apparatus generating hydrogen.

2. Description of Related Art

An example of method of storing hydrogen is a storage alloy method. In the storage alloy method, hydrogen is required to be stored not under a special condition such as an ultrahigh pressure and an ultralow temperature. Thus, handling is easy and a high safety is achieved. Further, an excellent feature is obtained that the amount of hydrogen storage per unit volume is high. Japanese Patent Application Laid-Open No. 2006-298670 discloses a hydrogen generation apparatus employing a storage alloy method. The hydrogen generation apparatus according to Japanese Patent Application Laid-Open No. 2006-298670 includes: a cylindrical storage chamber accommodating a powder mixture between magnesium-based hydride powder mainly composed of hydrogenated magnesium and acidic substance powder; a water storage chamber storing water; and a fuel cell. A configuration is employed that a water injection pipe led from the water storage chamber is inserted into the storage chamber so that water is supplied from the water storage chamber to the storage chamber. When water is supplied to the storage chamber, hydrolysis occurs in the magnesium-based hydride powder in accordance with Formula (1) so that hydrogen is generated. The generated hydrogen is supplied to the fuel cell and then used for power generation.

[Chemical Expression 1]

$$MgH_2 + 2H_2O \rightarrow Mg(OH)_2 + 2H_2 \quad (1)$$

SUMMARY OF THE INVENTION

However, in the hydrogen generation apparatus according to Japanese Patent Application Laid-Open No. 2006-298670, water is merely dripped through the water injection pipe into the storage chamber. Thus, there has been a problem that the amount of generated hydrogen becomes insufficient or excessive. Further, there has been a problem that in order to treat a case that hydrogen generation becomes excessive, the storage chamber is required to be constructed from a container having high-pressure resistance.

The present invention has been devised in view of such situations. An object thereof is to provide a hydrogen generation apparatus in which the amount of hydrogen to be generated is allowed to be controlled.

The hydrogen generation apparatus according to the present invention is characterized by comprising: a hydrogen generation container including an inner container whose upper side is opened for accommodating magnesium-based hydride and an outer container covering the inner container, the outer container being provided with a liquid injection hole which is arranged above the inner container; a liquid tank for storing liquid that is water or an aqueous solution containing any one of an acidic and alkaline substance; a pipe connected to the liquid tank and the liquid injection hole; a pump for operating to suction the liquid from the liquid tank and then pour the liquid through the pipe into the liquid injection hole so as to generate hydrogen by supplying the magnesium-based hydride with the liquid; a pressure gauge for measuring a pressure inside of the outer container; and a control unit for controlling the pump, wherein the outer container is provided with an exhaust hole for exhausting generated hydrogen, the control unit controls the amount of the liquid to flow through the pipe by the pump on the basis of the pressure value of the pressure gauge.

According to the present invention, on the basis of the pressure value of the pressure gauge, the control unit controls the amount of water caused to flow through the pipe by the pump. Thus, an appropriate amount of hydrogen is allowed to be generated.

The hydrogen generation apparatus according to the present invention is characterized by further comprising a temperature adjustment part for adjusting a temperature of the hydrogen generation container.

According to the present invention, cooling water is caused to flow in accordance with the temperature of the thermometer. Thus, a temperature suitable for a hydrolysis reaction of the magnesium-based hydride is allowed to be maintained. The hydrolysis reaction is increasingly accelerated with high temperatures. However, excessively high temperatures cause vaporization of water so as to reduce the yield. Thus, the temperature adjustment part maintains the temperature and the pressure such that the hydrolysis reaction is accelerated and the water in the hydrogen generation container does not go into a boiling region, so that the yield of hydrogen is improved.

The hydrogen generation apparatus according to the present invention is characterized in that the temperature adjustment part includes: a coolant storage container including a flowing passage through which liquid coolant flows and covering the outer container; and a thermometer for measuring the temperature of the hydrogen generation container, and wherein the control unit controls the amount of the liquid coolant to be stored in the coolant storage container on the basis of the temperature measured by the thermometer.

According to the present invention, temperature adjustment is performed depending on the amount of water in the water storage container covering the outer container. Thus, temperature adjustment is achieved effectively.

The hydrogen generation apparatus according to the present invention is characterized in that the temperature adjustment part includes: an air blow unit for blowing air to the hydrogen generation container; and a thermometer for measuring the temperature of the hydrogen generation container, and wherein the control unit controls an air flow rate of the air blow unit on the basis of the temperature measured by the thermometer.

According to the present invention, the hydrogen generation apparatus includes the air blow unit and the thermometer measuring the temperature of the hydrogen generation container. Then, on the basis of the temperature value measured by the thermometer, the control unit controls the air flow rate of the air blow unit. Thus, temperature adjustment is achieved simply.

The hydrogen generation apparatus according to the present invention is characterized by further comprising a hydrogen storage container for storing hydrogen exhausted through the exhaust hole.

According to the present invention, the hydrogen generation apparatus includes the hydrogen storage container and hence the hydrogen in the hydrogen storage container is allowed to be used even in a case of fluctuation in the electric power on the load side where the electric power generated by the fuel cell is used. Thus, even a case that the supply side of hydrogen or the electric power on the utilization side suffers sudden fluctuation, this situation is allowed to be treated. Further, even in a case that a large amount of hydrogen has been exhausted from the hydrogen generation container or, alternatively, the amount of exhausted hydrogen has decreased, since hydrogen is stored in the hydrogen storage container and the hydrogen is released from the hydrogen storage container, an appropriate amount of exhausted hydrogen is allowed to be maintained.

The hydrogen generation apparatus according to the present invention is characterized in that the hydrogen storage container includes: a hydrogen storage part performing expansion and contraction; a sealed container in the inside of which the hydrogen storage part is provided; an on-off valve provided in the outside of the sealed container and connected to the hydrogen storage part; a supply pipe provided in the sealed container to supply inert gas to a space between the hydrogen storage part and the sealed container; and an on-off valve for opening and closing the supply pipe.

According to the present invention, inert gas is supplied through the supply pipe so that the remaining amount of hydrogen stored in the hydrogen storage part is allowed to be reduced.

The hydrogen generation apparatus according to the present invention is characterized by further comprising a second pipe connected to the exhaust hole, wherein the liquid tank has a box shape and is provided with a hydrogen pipe which is joined to an upper bottom part of the liquid tank, one end of the hydrogen pipe is connected to the second pipe, and the other end of the hydrogen pipe is arranged near an inner bottom surface of the liquid tank.

According to the present invention, the hydrogen generated in the hydrogen generation container is exhausted through the second pipe to the vicinity of the inner bottom surface of the water tank. Thus, the exhausted hydrogen is allowed to be purified through the water or the aqueous solution stored in the water tank.

The hydrogen generation apparatus according to the present invention is characterized in that the inner container has a closed-end tubular shape and is provided with a mesh part or a plurality of holes formed in a side part thereof.

According to the present invention, the mesh part or the plurality of holes are provided in the side part of the inner container accommodating the magnesium-based hydride. Thus, the generated hydrogen is allowed to be efficiently exhausted to the outside of the inner container.

According to the present invention, on the basis of the pressure value of the pressure gauge, the control unit controls the amount of water caused to flow through the pipe by the pump. Thus, an appropriate amount of hydrogen is allowed to be generated.

The above and further objects and features of the invention will more fully be apparent from the following detailed description with accompanying drawings.

DETAILED DESCRIPTION

First Embodiment

Figure 1:
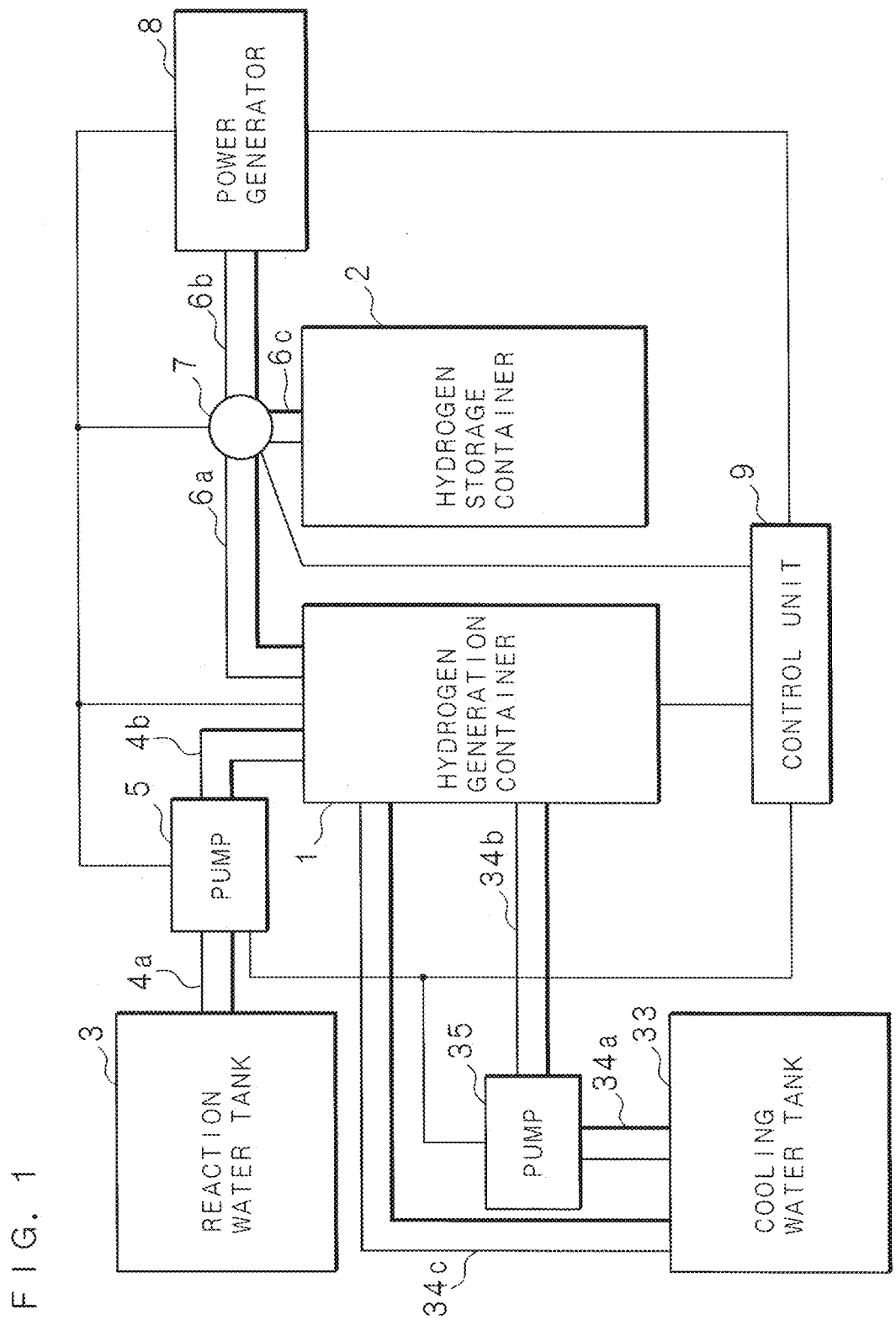
FIG. 1 is a block diagram illustrating a configuration of a hydrogen generation apparatus.

An embodiment of the present invention is described below. FIG. 1 is a block diagram illustrating a configuration of a hydrogen generation apparatus. The hydrogen generation apparatus includes: a reaction water tank 3 storing water used for a hydrolysis reaction; a pipe 4a whose one end is connected to the reaction water tank 3, a pump 5 connected to the other end of the pipe 4a; a pipe 4b whose one end is connected to the pump 5, a cooling water tank 33 storing cooling water; pipes 34a and 34c one end of each of which is connected to the cooling water tank 33, a pump 35 connected to the other end of the pipe 34a; a pipe 34b whose one end is connected to the pump 35, a hydrogen generation container 1 connected to the other end of each of the pipes 4b, 34b, and 34c; a pipe 6a whose one end is connected to the hydrogen generation container 1; an on-off valve 7 provided at the other end of the pipe 6a; a hydrogen storage container 2 connected through the pipe 6c to the on-off valve 7, a power generator 8 connected through the pipe 6b to the on-off valve 7, and a control unit 9.

In the hydrogen generation container 1, the water stored in the reaction water tank 3 is pumped up by the electric pump 5 and then sent through the pipes 4a and 4b to the hydrogen generation container 1. In the hydrogen generation container 1, magnesium-based hydride and the water supplied through the pipes 4a and 4b react with each other in accordance with Formula (1) so that hydrogen is generated. When the pipe 6a and the hydrogen storage container 2 are brought into fluid communication with each other by the on-off valve 7, the generated hydrogen is stored into the hydrogen storage container 2. Further, when the pipe 6b and the hydrogen storage container 2 are brought into fluid communication with each other by the on-off valve 7, the hydrogen in the hydrogen storage container 2 is sent to the power generator 8 provided with a fuel cell. Further, in the hydrogen generation container 1, for performing temperature adjustment as described later, water is caused to flow from the cooling water tank 33 through the pump 35 and the pipes 34*a* and 34*b* and then the water returns through the pipe 34*c* to the cooling water tank 33.

The power generator 8 supplies a part of generated electric power to the pump 5. The operation of the hydrogen generation container 1, the pump 5, the pump 35, and the on-off valve 7 is controlled by the control unit 9 constructed from a CPU. The hydrogen sent to the power generator 8 is used for an electrochemical reaction with oxygen so that power generation is achieved by the electrochemical reaction. The hydrogen generation container 1, the pump 5, the pump 35, the on-off valve 7, and the control unit 9 receives supply of electric power from the power generator 8.

Figure 2:
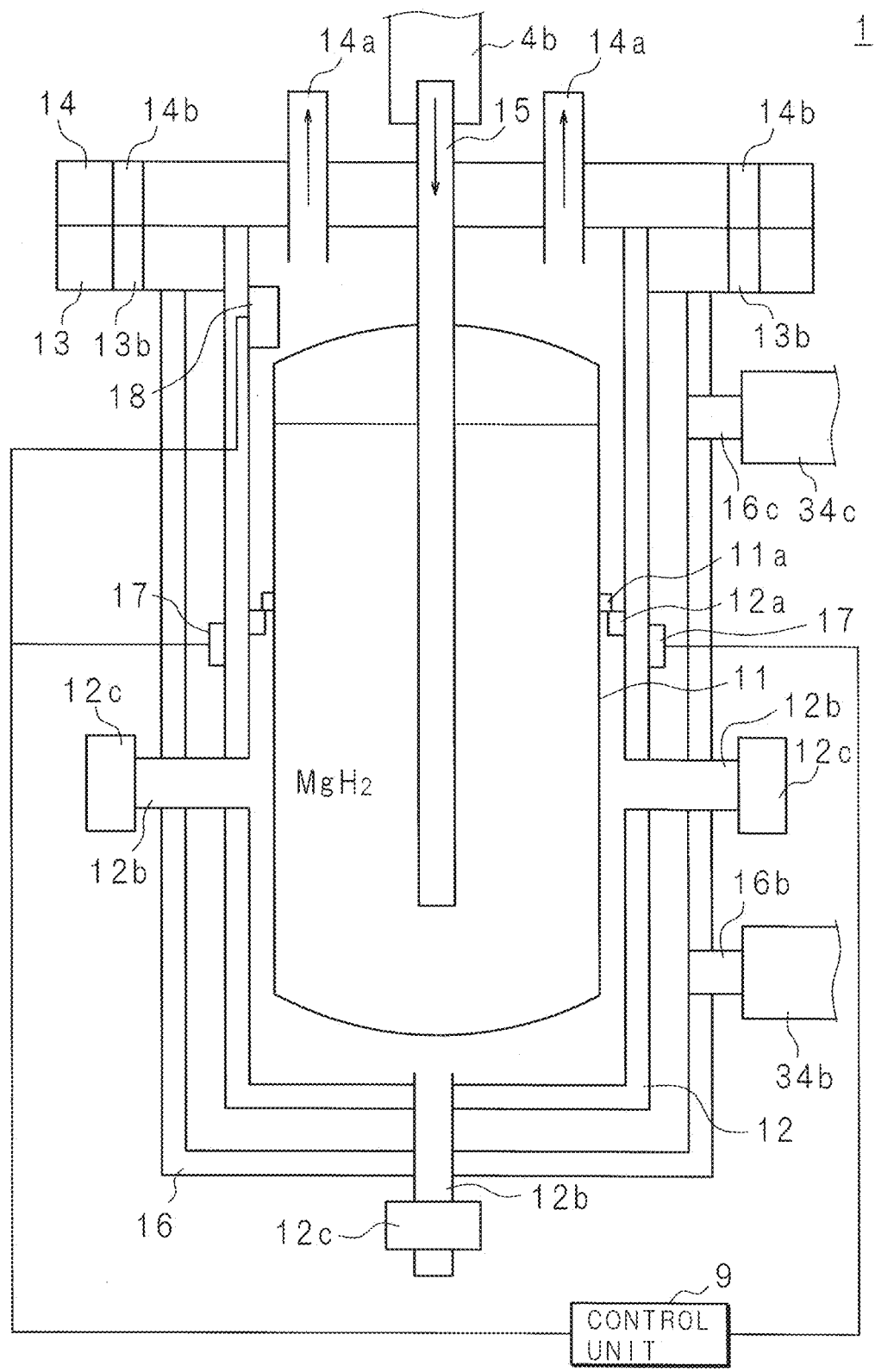
FIG. 2 is a schematic vertical sectional view illustrating a hydrogen generation container.

The hydrogen generation container 1 is described below. FIG. 2 is a schematic vertical sectional view illustrating the hydrogen generation container 1. The hydrogen generation container 1 includes: a magnesium-based hydride accommodation part 11, a hydrogen generation part 12 covering the magnesium-based hydride accommodation part 11, a water storage container 16 covering the hydrogen generation part 12; a flange 13 provided in the periphery of the hydrogen generation part 12; a lid 14 sealing the hydrogen generation part 12; a water injection pipe 15 pouring water into the magnesium-based hydride accommodation part 11, a thermometer 17; and a pressure gauge 18. The hydrogen generation part 12 and the water storage container 16 may be integrated in the form of a double jacketed container. A hydrogen generation part 61 is an outer container and a magnesium-based hydride accommodation part 62 is an inner container.

The magnesium-based hydride accommodation part 11 is fabricated from stainless steel, aluminum, or resin. The magnesium-based hydride accommodation part 11 has a closed-end cylindrical shape. The bottom part of the magnesium-based hydride accommodation part 11 has a warped plate shape whose center protrudes outward. The shape of the bottom part is not limited to a particular one. For example, the shape of the bottom part may be a conical shape. The inside of the magnesium-based hydride accommodation part 11 is filled with magnesium-based hydride in the form of tablets, powder, or the like.

In the magnesium-based hydride accommodation part 11, a protrusion 11*a* is provided in the periphery of the vicinity of the center in the height direction on the outer side-surface. The protrusion 11*a* has an annular shape. Further, the hydrogen generation part 12 has a closed-end cylindrical shape larger than the magnesium-based hydride accommodation part 11 in the height direction and in the radial direction and is fabricated from stainless steel, aluminum, or resin. A protrusion 12*a* is provided on the inner peripheral surface of the hydrogen generation part 12. The protrusion 12*a* has an annular shape. The protrusion 11*a* and the protrusion 12*a* may be provided in a part of the circumference.

When the protrusion 11*a* is locked on the upper part of the protrusion 12*a*, the magnesium-based hydride accommodation part 11 is arranged in a state that the bottom surface of the magnesium-based hydride accommodation part 11 and the inner surface of the bottom part of the hydrogen generation part 12 are separated from each other by a given gap. By virtue of this, the magnesium-based hydride accommodation part 11 is allowed to be easily removed from the inside of the hydrogen generation part 12. Thus, the work of refilling magnesium-based hydride in the magnesium-based hydride accommodation part 11 becomes easy.

In the hydrogen generation part 12, exhaust pipes 12*b*, 12*b*, and 12*b* through which gas is released in case of emergency are provided in the side part and the bottom part. The exhaust pipe 12*b* in the bottom part has a cylindrical shape and is provided such as to penetrate the hydrogen generation part 12 and the water storage container 16. In the exhaust pipes 12*b* in the side part, the internal holes lead from the inside of the hydrogen generation part 12 to the outside of the hydrogen generation container 1. The exhaust pipes 12*b*, 12*b*, and 12*b* are provided with on-off valves 12*c*, 12*c*, and 12*c*. The on-off valves 12*c*, 12*c*, and 12*c* are closed in a normal state.

Further, the inner wall of the hydrogen generation part 12 is provided with the pressure gauge 18 connected to the control unit 9. The pressure gauge 18 measures the pressure in the inside of the hydrogen generation part 12. In accordance with the pressure value measured by the pressure gauge 18, the control unit 9 controls the amount of water suctioned from the reaction water tank 3 by the pump 5. That is, when the pressure value goes up, the control unit 9 controls the pump 5 so as to reduce the amount of water suctioned from the reaction water tank 3 by the pump 5 and then exhausted through the pipes 4*a* and 4*b* and the water injection pipe 15 to the hydrogen generation part 12. Further, the control unit 9 performs control such that water suction is stopped at or above a pressure of certain value such as 0.30 [MPa]. Further, when the pressure value goes lower than a certain value such as 0.25 [MPa], the control unit 9 increases the amount of water suctioned by the pump 5. The amount of hydrogen generated in the hydrolysis reaction increases with increasing amount of water suctioned by the pump 5. Thus, when such control is performed, the amount of hydrogen generated in the inside of the hydrogen generation part 12 is allowed to be maintained at an appropriate value.

The flange 13 is provided with screw holes 13*b*, 13*b*, . . . .

The lid 14 is fabricated from stainless steel, aluminum, or resin, has a disk shape concentric with the flange 13, and is provided on the upper surface of the flange 13. The water injection pipe 15 of cylindrical shape penetrates the center part of the lid 14. The lower end part of the water injection pipe 15 is inserted into the magnesium-based hydride. Further, the water injection pipe 15 is connected to the pump 5.

On the other hand, hydrogen exhaust pipes 14*a* and 14*a* of cylindrical shape are provided around the water injection pipe 15 in the lid 14. The hydrogen exhaust pipes 14*a* and 14*a* are connected to the pipe 6*a* so as to exhaust to the pipe 6*a* the hydrogen generated in the hydrogen generation part 12 by the hydrolysis reaction according to Formula (1).

Further, in the lid 14, insertion holes 14*b*, 14*b*, . . . are provided at positions corresponding to the screw holes. Screwing is performed by screws penetrating the screw holes 13*b*, 13*b*, . . . and the insertion holes 14*b*, 14*b*, . . . so that the lid 14 is joined to the flange 13 without a gap.

The water storage container 16 is fabricated from stainless steel, aluminum, or resin and has a somewhat smaller diameter than the lid 14 and the flange 13. Further, the water storage container 16 has a closed-end cylindrical shape higher than the magnesium-based hydride accommodation part 11 in the height direction and is provided on the outer side of the hydrogen generation part 12. In the entirety of the water storage container 16, an insulation member such as rigid urethane and plastics is provided between the inner wall and the outer wall. The exhaust pipe 12*b* penetrates the side part and the bottom part of the water storage container 16. The upper end of the water storage container 16 is joined to the lower surface of the flange 13.

The exhaust pipe 12b penetrates the side part of the water storage container 16. By virtue of this, the hydrogen generation part 12 is fixed to the water storage container 16. Further, a water injection pipe 16b provided in a lower part of the water storage container 16 is connected to the pipe 34b and then a drain pipe 16c provided in an upper part of the water storage container 16 is connected to the pipe 34c. The water injection pipe 16b and the drain pipe 16c have cylindrical shapes. The control unit 9 causes the pump 35 to suction the water stored in the cooling water tank 33 and then pour it through the water injection pipe 16b into a gap between the water storage container 16 and the hydrogen generation part 12. Further, the water is exhausted through the drain pipe 16c so as to be returned to the cooling water tank 33. By virtue of this, the temperature of the hydrogen generation part 12 is adjusted. Here, this gap corresponds to a flowing passage in the claim.

The thermometer 17 is composed of a Peltier device and provided on the outer surface of the hydrogen generation part 12. The thermometer 17 is connected to the control unit 9. Thus, the temperature measured by the thermometer 17 is approximately equal to the temperature of the magnesium-based hydride accommodation part 11. When the temperature measured by the thermometer 17 goes higher than or equal to 105° C. or the like, the control unit 9 causes the pump 35 to operate so that water flows from the cooling water tank 33 through the pipes 34a and 34b into the water storage container 16 and thereby the water is stored. Further, when the temperature measured by the thermometer 17 goes lower than or equal to 85° C. or the like, the control unit 9 stops the pump 35 and opens the drain pipe 16c so as to perform drainage. The drained water is returned through the pipe 34c to the cooling water tank 33. As such, when the amount of stored water is controlled on the basis of the measured value of the thermometer 17, the inside of the hydrogen generation part 12 is maintained at a temperature in which the hydrolysis reaction of Formula (1) is accelerated and yet a situation is suppressed that the water in the hydrogen generation part 12 is vaporized and exhausted at a temperature above the boiling point.

Figure 3:
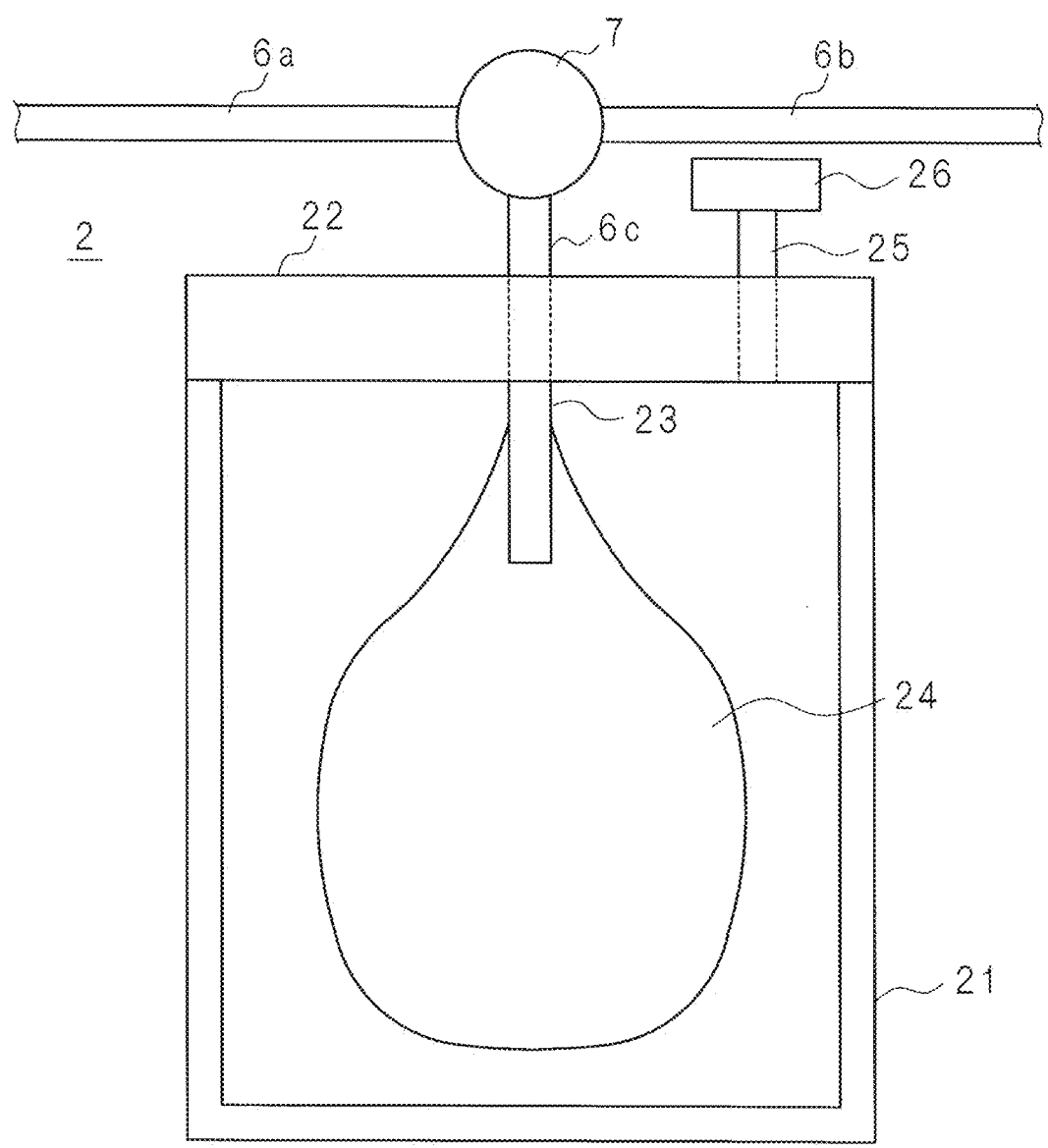
FIG. 3 is a schematic vertical sectional view illustrating a hydrogen storage container.

FIG. 3 is a schematic vertical sectional view illustrating the hydrogen storage container 2. The hydrogen storage container 2 includes: a container part 21; a lid 22 covering the container part 21; a hydrogen pipe 23 penetrating the lid 22; a movable part 24 attached to the hydrogen pipe 23; a supply pipe 25 attached to the lid 22; and an on-off valve 26 attached to the supply pipe 25.

The container part 21 is fabricated from stainless steel, aluminum, or resin and has a closed-end cylindrical shape. The lid 22 has a disk shape fabricated from stainless steel, aluminum, or resin and is joined such as to cover the opening portion of the container part 21. The container part 21 and the lid 22 constitute a sealed container. The hydrogen pipe 23 penetrates a hole provided in the center of the lid 22. The upper end of the hydrogen pipe 23 is connected through the on-off valve 7 to the pipes 6a and 6b. The movable part 24 is fabricated from freely expandable and contractible rubber or resin and is connected to the lower end of the hydrogen pipe 23. The supply pipe 25 penetrates a hole provided in the lid 22. The on-off valve 26 is provided in the end part of the supply pipe 25 and injects a certain amount of inert gas such as nitrogen and argon into a space between the movable part 24 and the container part 21.

The pressure of the inert gas between the movable part 24 and the container part 21 is set up to be such a pressure that the entirety of the hydrogen in the movable part 24 is exhausted. For example, in a case that the pressure in the power generator 8 is 0.04 atm, an amount of inert gas that realizes 0.05 atm or the like which is greater than the 0.04 atm when the entirety of the hydrogen in the movable part 24 has been exhausted is injected between the movable part 24 and the container part 21. By virtue of this, the hydrogen in the movable part 24 is pushed by the atmospheric pressure between the movable part 24 and the container part 21 so as to be exhausted finally without remaining in the hydrogen storage container 2.

In order to generate hydrogen in the hydrogen generation container 1, a certain time is taken, for example, because the pump 5 is to be operated. Thus, when electric power is to be immediately generated by the power generator 8, the on-off valve 7 is opened so that the hydrogen stored in the hydrogen storage container 2 is exhausted. Further, when an excessive amount or alternatively an insufficient amount of hydrogen is generated from the hydrogen generation container 1 or, alternatively, when electric power corresponding to the load from the fuel cell is required, the amount of exhaust is adjusted in the hydrogen storage container 2 such that an appropriate amount of hydrogen is supplied.

Here, in place of water, an aqueous solution may be employed that is obtained by adding an acidic substance such as citric acid or an alkali substance to water. When an acidic substance or an alkali substance is added, the hydrolysis reaction of magnesium-based hydride is allowed to be accelerated and hence hydrogen generation and power generation are allowed to be achieved effectively. In other points, the shapes of the hydrogen generation container 1 and the hydrogen storage container 2 are not limited to particular ones. For example, a container may be employed in which the container and the lid are integrated with each other and not separated from each other. The on-off valve 7 may be a control valve controlling the flow rate in addition to the opening and closing. The water flowing through the water injection pipe (liquid injection pipe) 15 and the water stored in the water storage container 16 may be identical water from the reaction water tank 3 and may be water from water tanks separate from each other.

According to the present embodiment, a hydrogen generation apparatus is provided in which a hydrolysis reaction of magnesium-based hydride is allowed to be accelerated and yet vaporization is prevented so that the yield is improved.

Here, the hydrogen generation apparatus may be used as an apparatus sending generated hydrogen to the power generator 8 so as to generate electric power as well as an apparatus merely supplying generated hydrogen.

Figure 4:
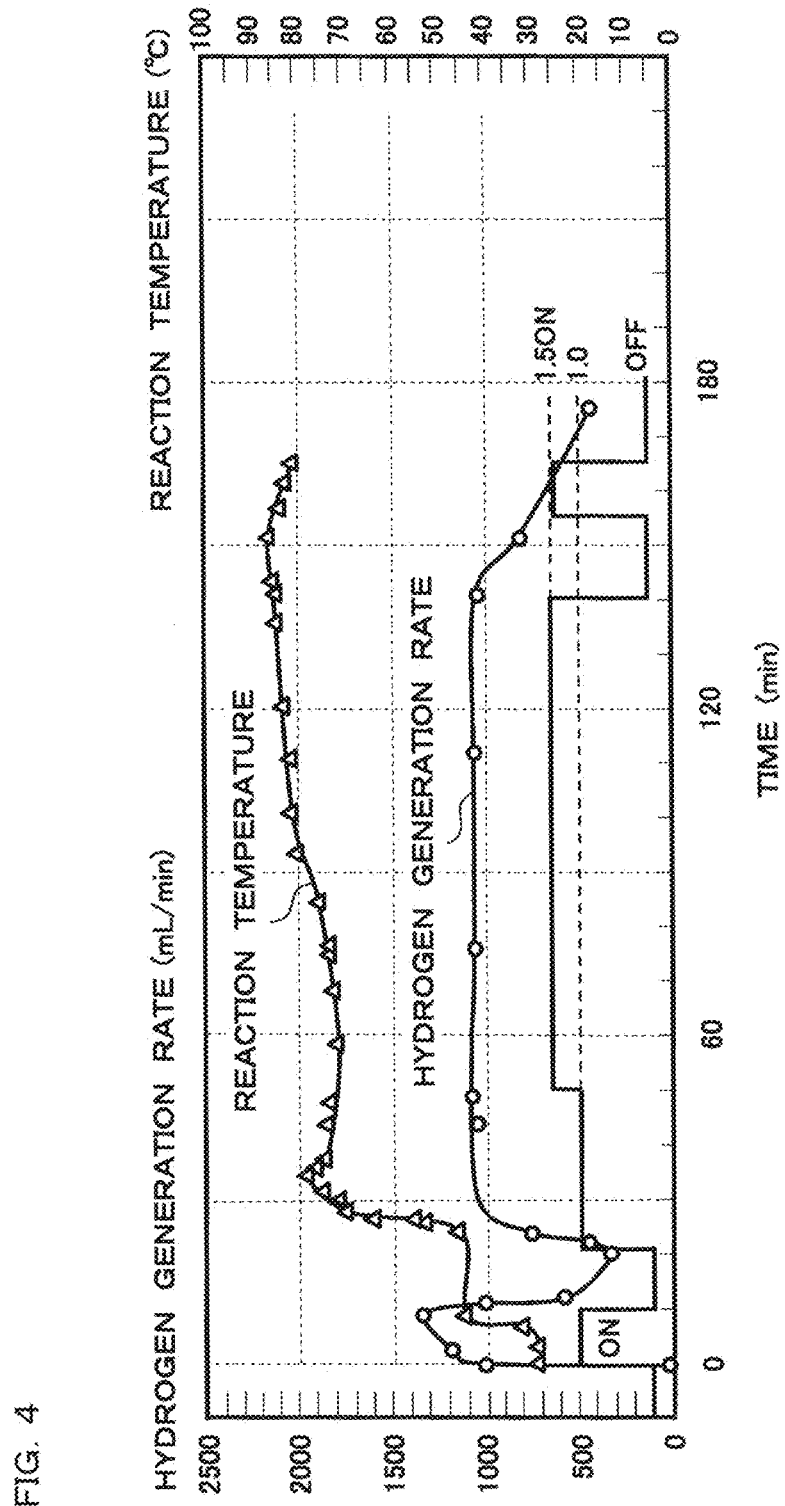
FIG. 4 is a graph illustrating measurement performed by using a hydrogen generation apparatus.

FIG. 4 is a graph illustrating measurement performed by using the hydrogen generation apparatus. The horizontal axis indicates time and the vertical axis indicates the reaction temperature [° C.] of the hydrogen generation part 12, the hydrogen generation rate [mL/min] and the ON/OFF of the pump 5. In the graph of FIG. 4, a solid line containing circle marks indicates the temporal change of the hydrogen generation rate and a solid line containing triangle marks indicates the temporal change of the reaction temperature. A solid line without marks indicates the ON/OFF of the pump 5.

When the pump 5 is turned ON, the hydrogen generation rate is increased in comparison with the OFF case and then maintained at a fixed rate of 1100 [mL/min] or the like. Further, the control unit 9 controls the amount of stored water in the water storage container 16 so as to adjust the temperature. Thus, the reaction temperature is maintained at 70 to 90 [° C.] or the like.

Second Embodiment

A second embodiment is described below. In the present embodiment, temperature adjustment of the hydrogen generation part 12 is performed by air cooling in place of water cooling so that temperature adjustment is achieved.

Figure 5:
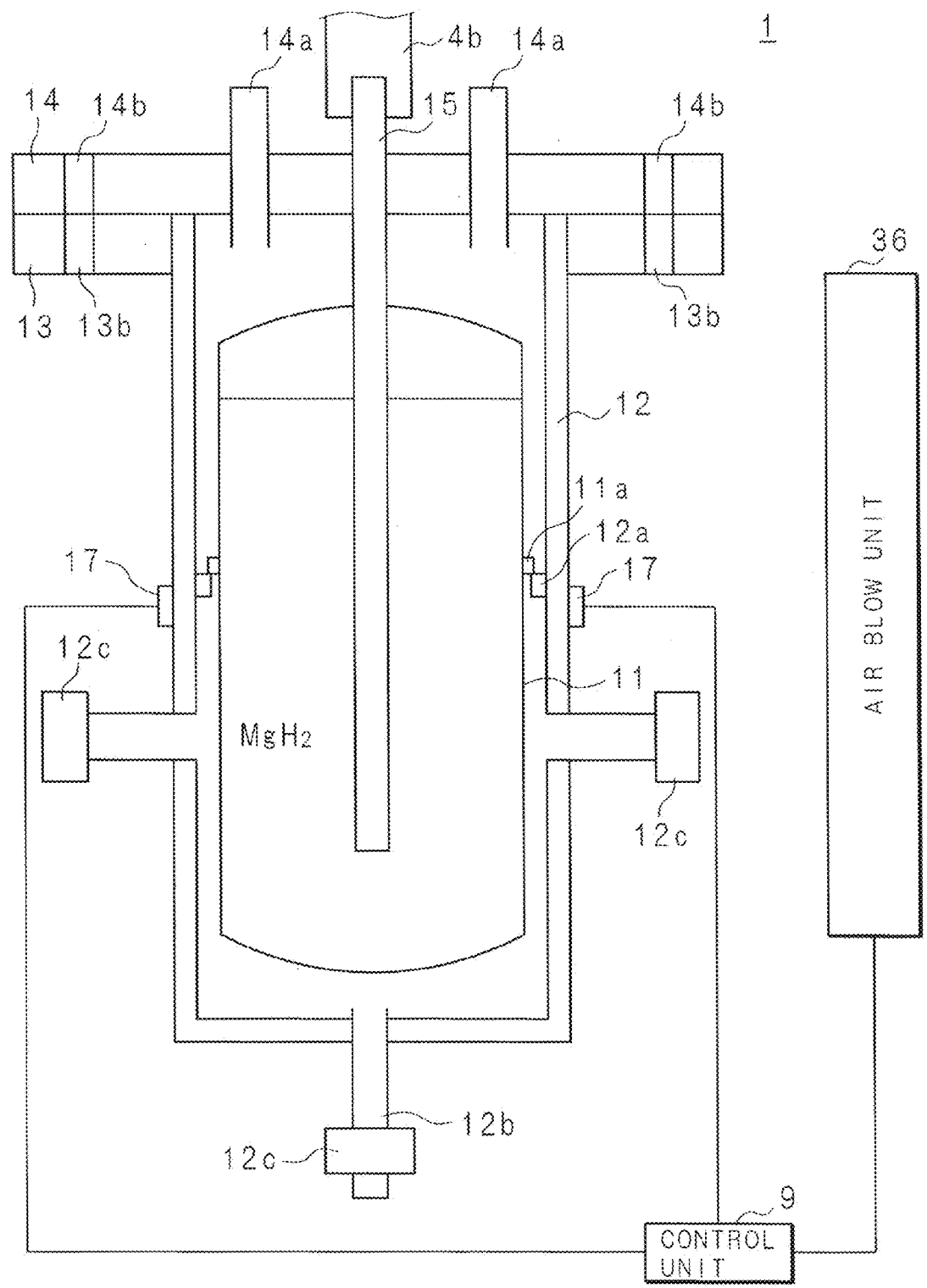
FIG. 5 is a schematic vertical sectional view illustrating a hydrogen generation container.

FIG. 5 is a schematic vertical sectional view illustrating the hydrogen generation container 1. The hydrogen generation container 1 in the present embodiment is provided with an air blow unit 36 serving as a temperature adjustment part. The air blow unit 36 is a fan whose blades are driven by an electric motor. The air blow unit 36 is arranged at a position and in a direction such that wind at the time of operation hits the hydrogen generation part 12. Further, the air blow unit 36 is controlled by the control unit 9 such that air blowing is started or stopped on the basis of the temperature measured by the thermometer 17. The thermometer 17 is provided in the outer surface of the hydrogen generation part 12 and, instead, may be provided on the inner side of the hydrogen generation part 12.

When the temperature measured by the thermometer 17 goes higher than or equal to a certain temperature of 105° C. or the like, the control unit 9 causes the air blow unit 36 to start air blowing. Further, when the temperature measured by the thermometer 17 goes lower than or equal to a certain temperature of 85° C. or the like, the control unit 9 causes the air blow unit 36 to stop air blowing. Further, in accordance with the temperature measured by the thermometer 17, the magnitude of the air flow rate sent from the air blow unit 36 may be adjusted.

According to the present embodiment, temperature adjustment of the hydrogen generation part 12 is performed by the air blow unit 36. Thus, temperature adjustment is achieved simply. In particular, this configuration is suitable for a hydrogen generation apparatus generating relatively small electric power of 100 [W] or the like.

Third Embodiment

A third embodiment is described below. In the present embodiment, dehumidification and deodorization is performed on the hydrogen generated by the hydrogen generation part 12.

Figure 6:
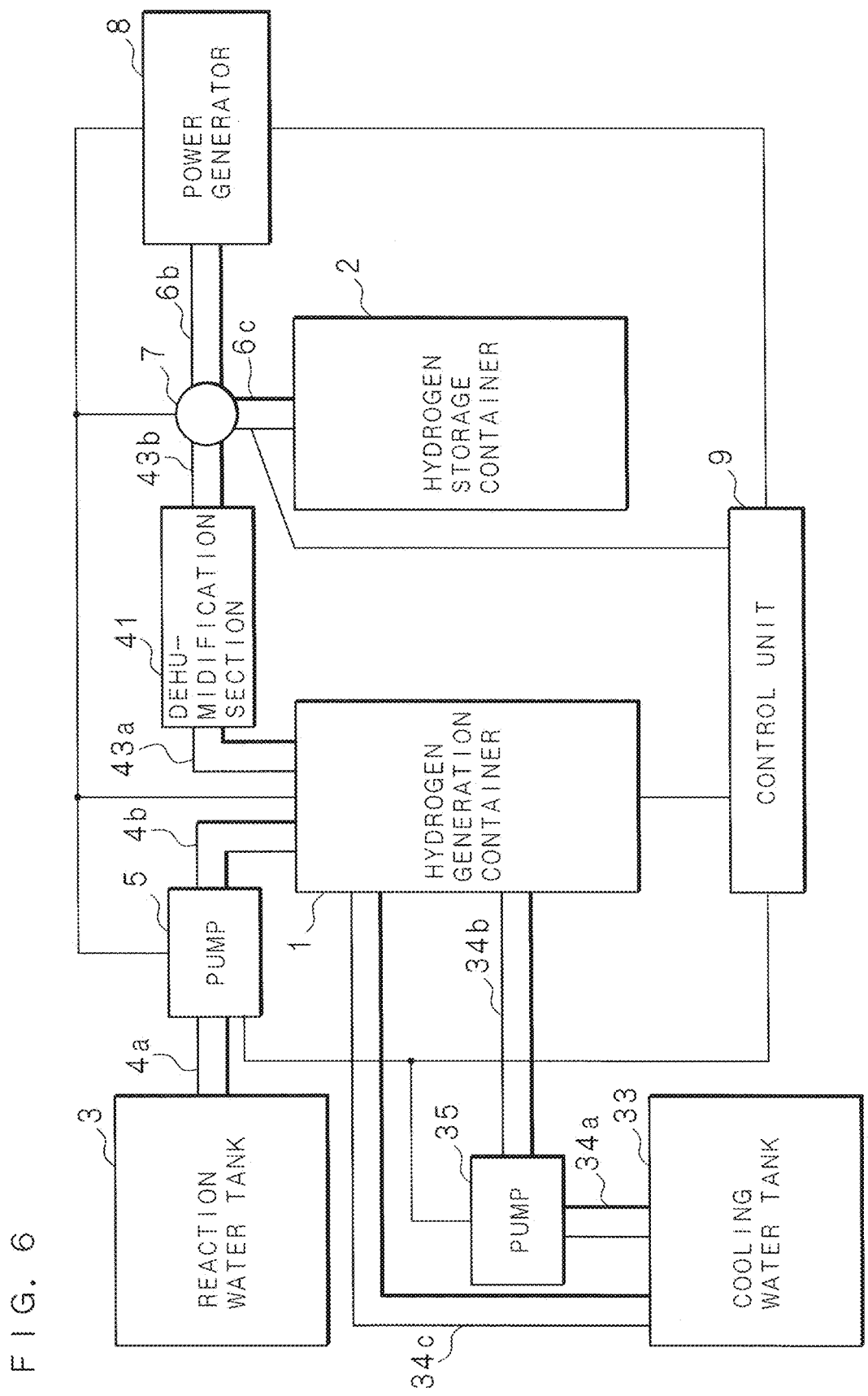
FIG. 6 is a block diagram illustrating a configuration of a hydrogen generation apparatus provided with a dehumidification section.

FIG. 6 is a block diagram illustrating a configuration of a hydrogen generation apparatus provided with a dehumidification section 41. In the present embodiment, the dehumidification section 41 is provided between pipes 43a and 43b. For example, the dehumidification section 41 is a container in which a hole leading to the inside is provided at each of two sites in the outer surface and the inside of which is filled with zeolite. Among the holes of the dehumidification section 41, one is connected to the pipe 43a connected to the hydrogen generation container 1 and the other is connected to the pipe 43b connected to the hydrogen storage container 2. When the hydrogen sent through the pipe 43a goes through the dehumidification section 41, moisture is adsorbed by zeolite so that dehumidification is achieved. Here, the dehumidification section 41 may be provided in the middle of the pipe 6b.

Figure 7:
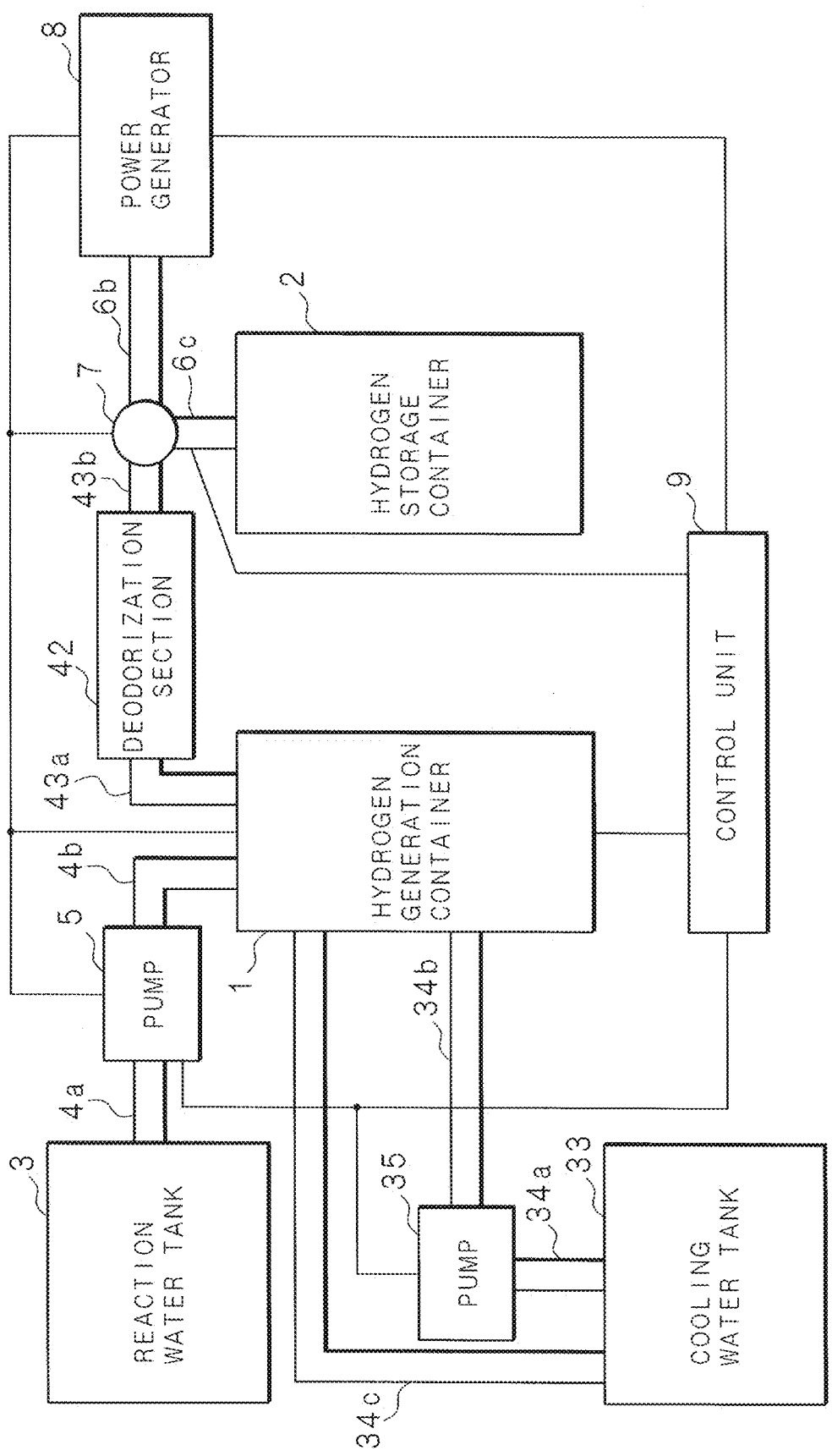
FIG. 7 is a block diagram illustrating a configuration of a hydrogen generation apparatus provided with a deodorization section.

FIG. 7 is a block diagram illustrating a configuration of a hydrogen generation apparatus provided with a deodorization section 42. Further, the hydrogen generation apparatus may be provided with a deodorization section 42 in place of the dehumidification section 41 or, alternatively, together with the dehumidification section 41. For example, the deodorization section 42 is a container in which a hole leading to the inside is provided at each of two sites in the outer surface and the inside of which is filled with activated carbon. One side of the deodorization section 42 is connected to the pipe 43a and the other side is connected to the pipe 43b.

Figure 8:
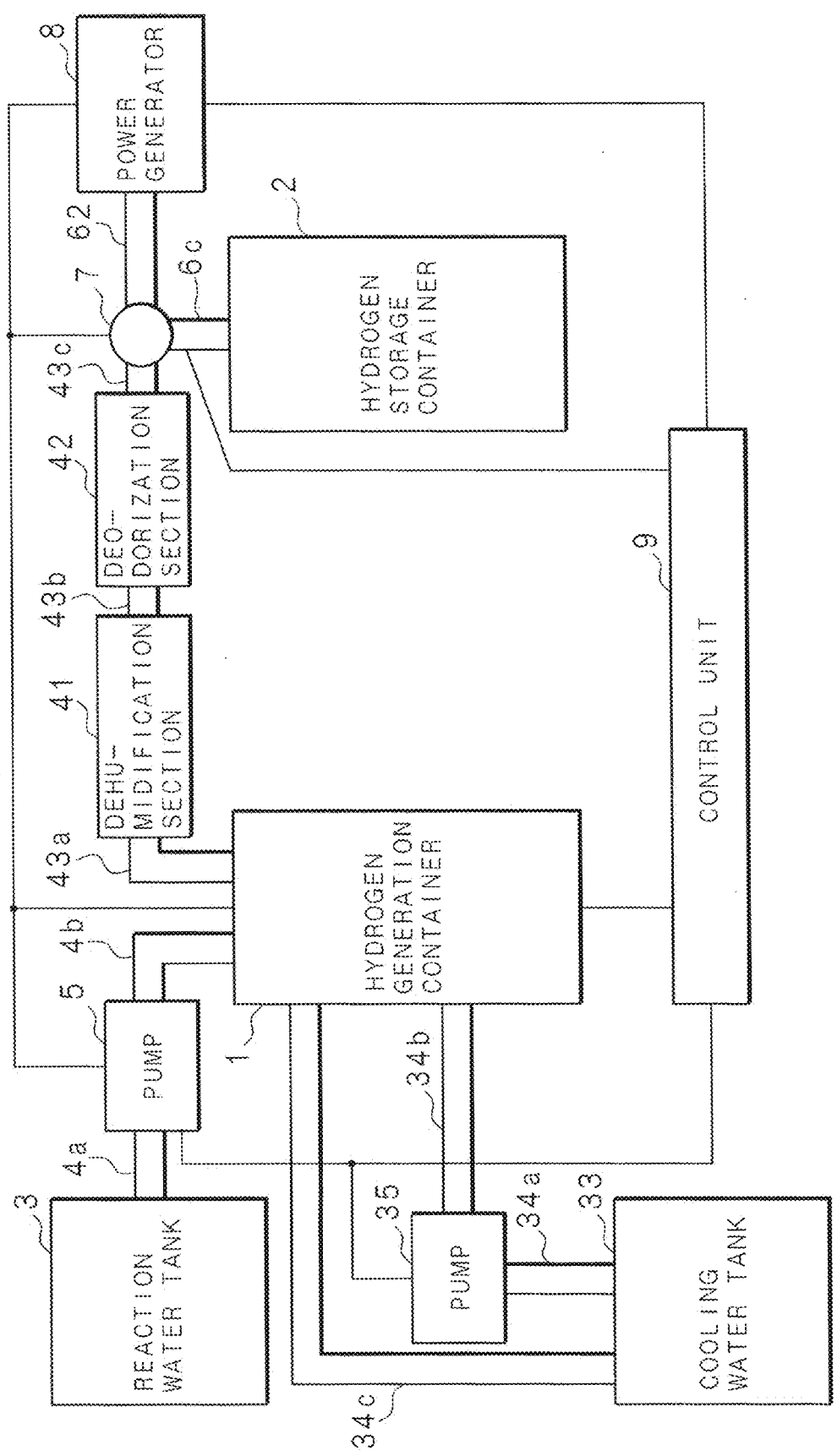
FIG. 8 is a block diagram illustrating a configuration of a hydrogen generation apparatus provided with a dehumidification section and a deodorization section.

FIG. 8 is a block diagram illustrating a configuration of the hydrogen generation apparatus provided with the dehumidification section 41 and the deodorization section 42. FIG. 8 illustrates an example that the dehumidification section 41 is connected to the pipes 43a and 43b and the deodorization section 42 is connected to the pipes 43b and 43c. Here, the sites where the dehumidification section 41 and the deodorization section 42 are provided may be exchanged with each other from those illustrated in FIG. 8. Each of the dehumidification section 41 and the deodorization section 42 may be provided in the middle of the pipe 62.

Fourth Embodiment

A fourth embodiment is described below. The present embodiment relates to a mode that the water stored in the water tank is used for purification of the generated hydrogen in addition to the hydrolysis reaction.

Figure 9:
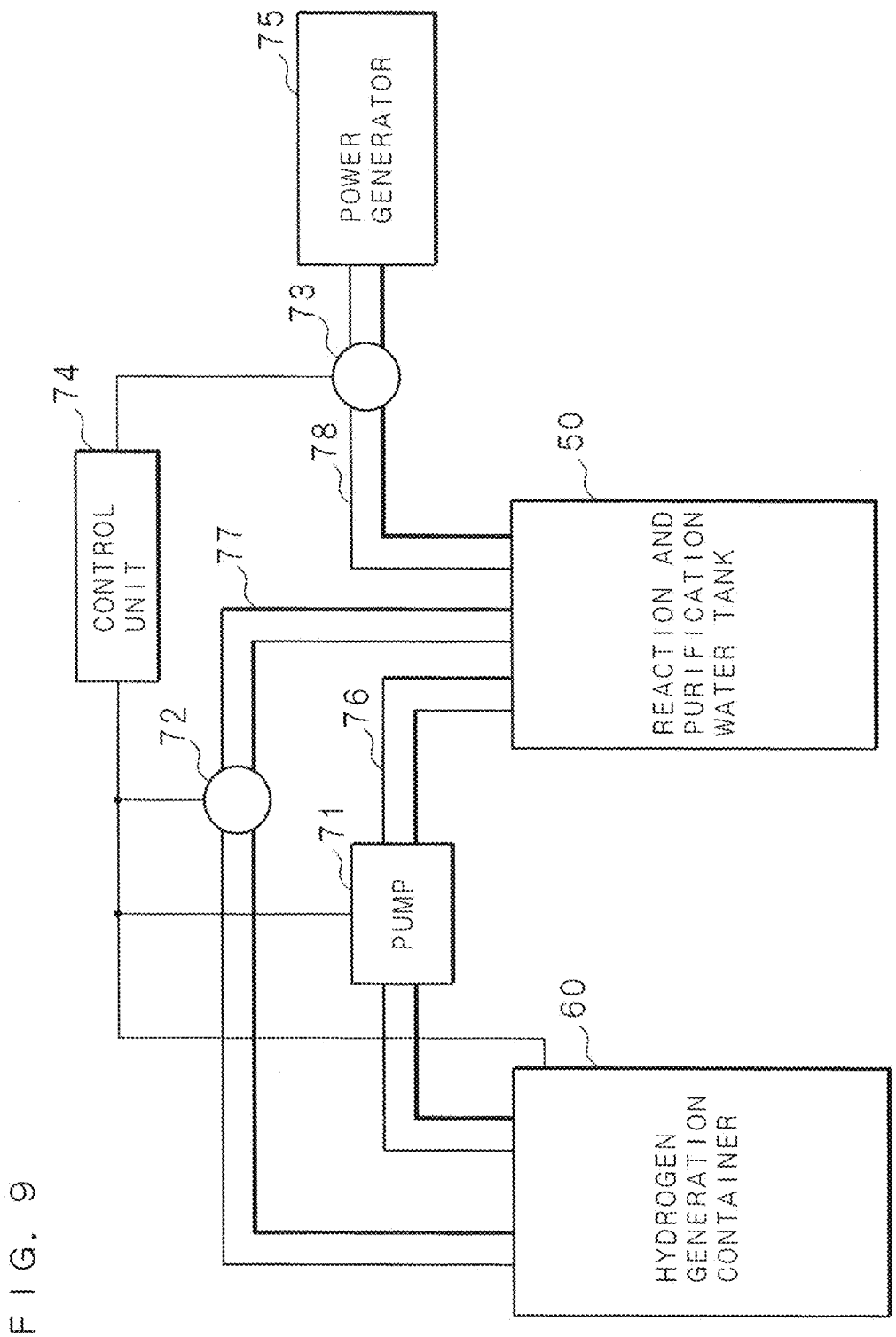
FIG. 9 is a block diagram illustrating a hydrogen generation apparatus.

FIG. 9 is a block diagram illustrating a hydrogen generation apparatus. The hydrogen generation apparatus includes a reaction and purification water tank 50, a hydrogen generation container 60, a pump 71, adjusting valves 72 and 73, a control unit 74, a power generator 75, and pipes 76, 77, and 78.

Figure 10:
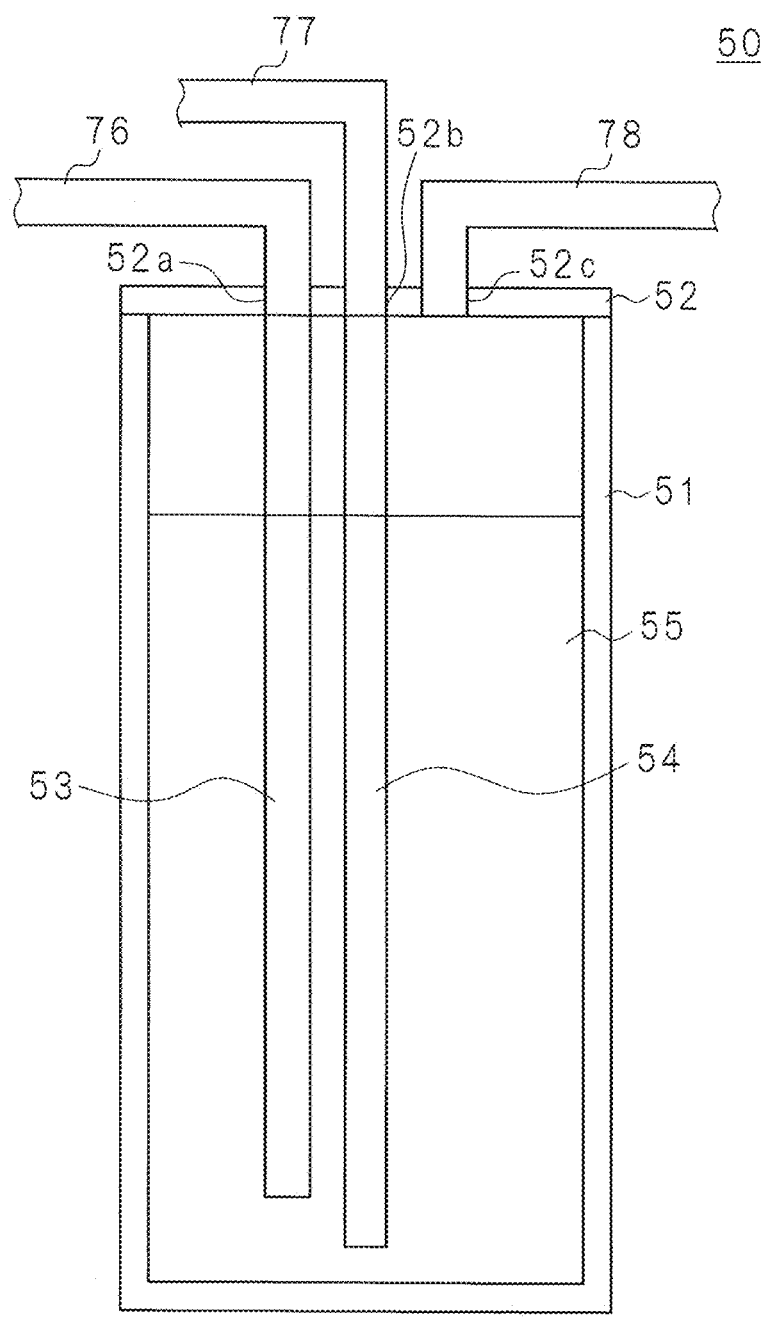
FIG. 10 is a schematic horizontal sectional view illustrating a reaction and purification water tank.

FIG. 10 is a schematic horizontal sectional view illustrating the reaction and purification water tank 50. The reaction and purification water tank 50 includes a storage part 51, a lid 52, a water supply pipe 53, and a purification pipe 54.

The storage part 51 is a container having a closed-end cylindrical shape. The lid 52 has a disk shape whose diameter is greater than the inner diameter of the storage part 51. The lid 52 is provided at the upper end of the storage part 51 and covers the opening portion of the storage part 51. Each of the storage part 51 and the lid 52 is fabricated from metal such as aluminum and stainless steel or from resin and has pressure resistance. Further, when screwing or the like is performed, the storage part 51 and the lid 52 go into close contact with each other concentrically without a gap so as to constitute a box-shaped container. The lid 52 is provided with the holes 52a, 52b, and 52c respectively penetrating the lid 52. The holes 52a and 52b are arranged near the center of the lid 52 in plan view and the hole 52c is provided at the outer side than the holes 52a and 52b. The peripheries of the holes 52a, 52b, and 52c are in the form of sockets.

Here, the holes 52a, 52b, and 52c are connected respectively to the pipes 76, 77, and 78 provided in the outside of the reaction and purification water tank 50. The pipes 76, 77, and 78 are fabricated from resin and have flexibility. Further, both ends of each of the pipes 76, 77, and 78 are in the form of plugs such as to fit in the holes 52a, 52b, and 52c without a gap.

The water supply pipe 53 is a pipe of straight line shape provided in the inside of the storage part 51. In the water supply pipe 53, the upper end is joined to the lower end of the hole 52a. Then, the water supply pipe 53 extends in the height direction of the storage part 51 and the lower end is arranged near the inner bottom surface of the storage part 51.

The purification pipe 54 is a pipe of straight line shape provided in the inside of the storage part 51. The purification pipe 54 extends in the height direction of the storage part 51. Then, the upper end is joined to the lower end of the hole 52b and the lower end is arranged near the inner bottom surface of the storage part 51. Here, the lower end of the purification pipe 54 extends to a position closer to the inner bottom surface of the storage part 51 than the water supply pipe 53. The water supply pipe 53 and the purification pipe 54 are fabricated from resin.

Here, a configuration may be employed that the water supply pipe 53 and the purification pipe 54 respectively penetrate the holes 52a and 52b and the upper ends are arranged in the outside of the lid 52. In this case, the water supply pipe 53 and the purification pipe 54 are joined to the lid 52 respectively in the middle. Then, the upper ends of the water supply pipe 53 and the purification pipe 54 are connected directly to the pipes 76 and 77, respectively.

Water 55 is stored in the inside of the storage part 51. The amount of the water 55 stored is such an amount that the lower ends of the water supply pipe 53 and the purification pipe 54 are immersed sufficiently. Here, in place of water, an aqueous solution may be employed that is obtained by adding an acidic substance such as citric acid or an alkali substance to water.

Figure 11:
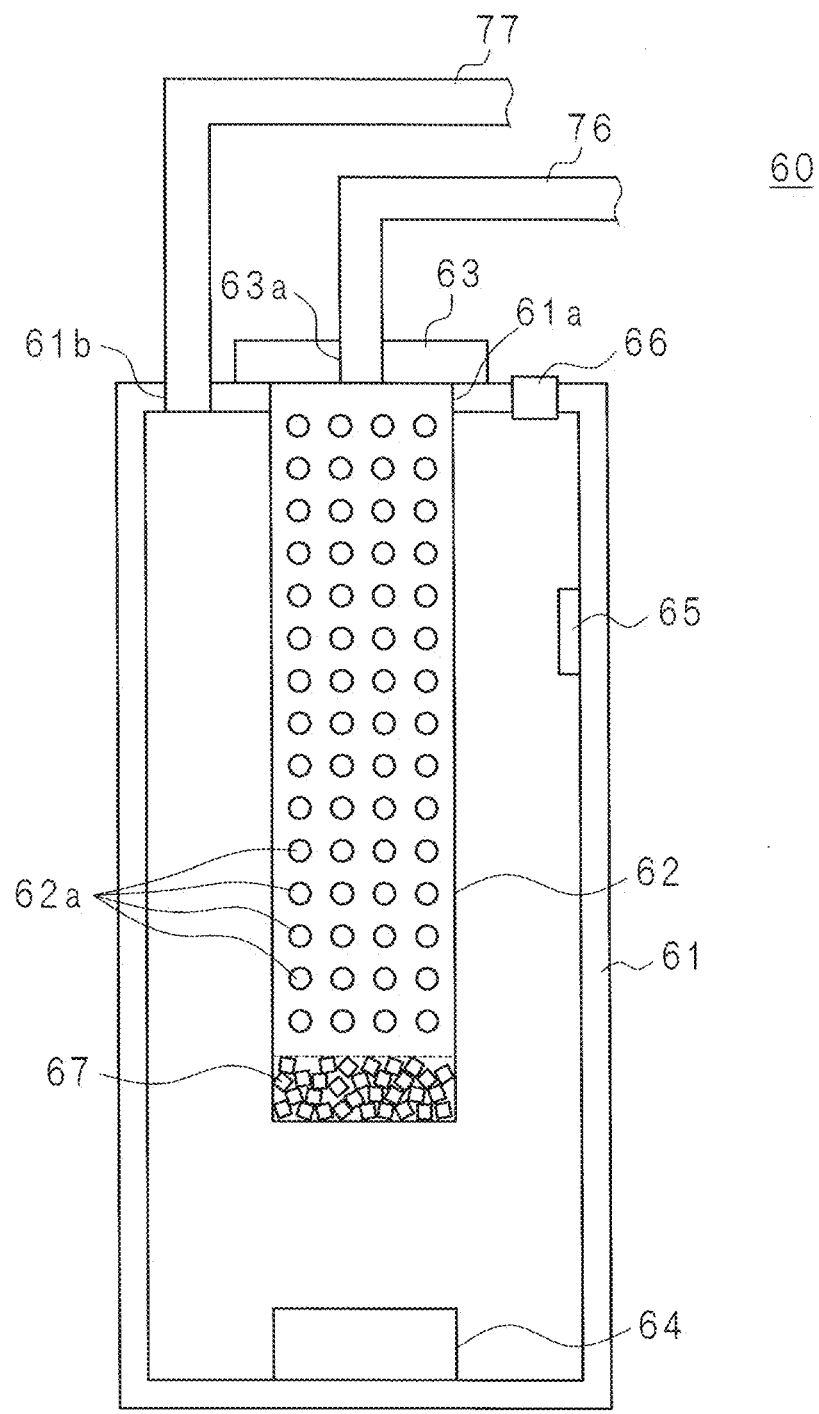
FIG. 11 is a schematic horizontal sectional view illustrating a hydrogen generation container.

FIG. 11 is a schematic horizontal sectional view illustrating the hydrogen generation container 60. The hydrogen generation container 60 includes: a hydrogen generation part 61 serving as an outer container; a magnesium-based hydride accommodation part 62 serving as an inner container; a lid 63; absorbent 64; a pressure gauge 65; and a safety valve 66.

The hydrogen generation part 61 is a container whose inside has a hollow cylindrical shape. The hydrogen generation part 61 is fabricated from metal such as aluminum and stainless steel or from resin and has pressure resistance. In the upper bottom part of the hydrogen generation part 61, a fitting hole 61a is provided in the center. Further, an exhaust hole 61b leading to the inside is provided around the fitting hole 61a in the upper bottom part of the hydrogen generation part 61. The periphery of the exhaust hole 61b is formed in the shape of a socket and fit in the other end of the pipe 77 without a gap.

The magnesium-based hydride accommodation part 62 is a container of closed-end cylindrical shape which has a diameter smaller than the fitting hole 61a and a height lower than the hydrogen generation part 61 and the upper side of which is opened. The magnesium-based hydride accommodation part 62 is fabricated from resin such as plastics. The magnesium-based hydride accommodation part 62 is fit in through the fitting hole 61a and then arranged in the inside of the hydrogen generation part 61. Further, a plurality of side-part holes 62a, 62a, ... are provided in the side part of the magnesium-based hydride accommodation part 62 other than the vicinity of the bottom surface.

Further, magnesium-based hydride 67 is accommodated in the vicinity of the bottom surface of the magnesium-based hydride accommodation part 62. The magnesium-based hydride 67 is in the form of substantially rectangular parallelepiped objects obtained by dividing plate-shaped tablets or, alternatively, in the form of powder.

Figure 12:
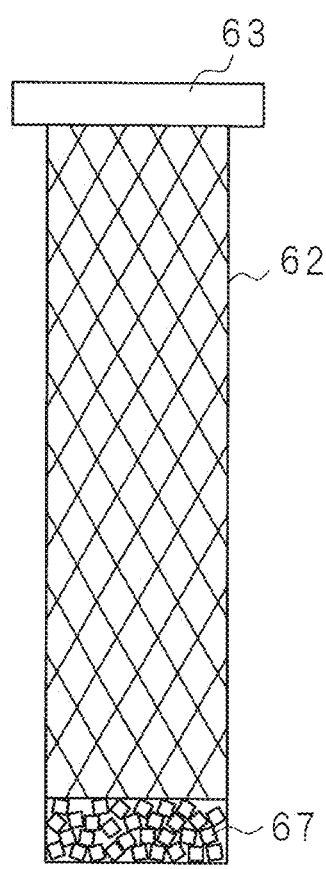
FIG. 12 is a schematic sectional side view illustrating a magnesium-based hydride accommodation part and a lid.

Here, the shape of the magnesium-based hydride accommodation part 62 may be a polygonal tube or an elliptic tube and is not limited to a particular one as long as the shape is closed-end tubular. FIG. 12 is a schematic sectional side view illustrating the magnesium-based hydride accommodation part 62 and the lid 63. The side part of the magnesium-based hydride accommodation part 62 other than the vicinity of the bottom surface may be in the form of a mesh.

The lid 63 has a disk shape whose outer diameter is larger than the opening portion of the magnesium-based hydride accommodation part 62 and the fitting hole 61a. The lid 63 is joined to the opening portion of the magnesium-based hydride accommodation part 62 and covers the magnesium-based hydride accommodation part 62. The lid 63 is fabricated from metal such as aluminum and stainless steel or from resin.

Here, the lid 63 is allowed to be opened and closed in order that magnesium-based hydride may be accommodated in the inside of the magnesium-based hydride accommodation part 62. For example, a configuration may be employed that each of the joining parts of the magnesium-based hydride accommodation part 62 and the lid 63 is provided with a thread groove so that the magnesium-based hydride accommodation part 62 and the lid 63 are separable from each other. Further, a configuration may be employed that a part of each of the joining parts of the magnesium-based hydride accommodation part 62 and the lid 63 is provided with a hinge so that the lid 63 is allowed to be rotated about the hinge.

A water injection hole 63a is provided in the center of the lid 63. The periphery of the water injection hole 63a is formed in the shape of a socket and fit in the other end of the pipe 76 without a gap.

The lid 63 is placed on the hydrogen generation part 61 such that the periphery portion of the lower surface goes into contact with a portion of the upper surface of the hydrogen generation part 61 near the fitting hole 61a. Thus, the magnesium-based hydride accommodation part 62 having been fit in the fitting hole 61a is arranged in a state of being hung in the inside of the hydrogen generation part 61. Here, the hydrogen generation part 61 and the lid 63 are in close contact with each other without a gap by screwing or the like.

An absorbent 64 is provided on the inner bottom surface of the hydrogen generation part 61. An example of the absorbent 64 is high polymers such as sodium polyacrylate. However, employable absorbents are not limited to a particular one as long as the material absorbs water. For example, when water is poured through the water injection hole 63a, a part of water leaks from the magnesium-based hydride accommodation part 62 in some cases. Alternatively, when the hydrolysis reaction between water and magnesium-based hydride occurs in the magnesium-based hydride accommodation part 62, the water is ejected from the magnesium-based hydride accommodation part 62 in some cases. The absorbent 64 absorbs the water accumulated on the inner bottom surface of the hydrogen generation part 61 owing to such causes.

The pressure gauge 65 is of a semiconductor piezoresistance type, an electrostatic capacitance type, or the like. The pressure gauge 65 is provided on the inner wall of the hydrogen generation part 61 and measures the pressure of the inside of the hydrogen generation part 61. Further, the pressure gauge 65 is electrically connected to the control unit 74 and transmits the measured value to the control unit 74, for example, with a fixed period.

The safety valve 66 is a valve of spring type. The safety valve 66 is provided on the upper bottom part of the hydrogen generation part 61. Then, for example, when the pressure in the inside of the sealed hydrogen generation part 61 reaches 3 [bar] or the like, the valve opens and exhausts the gas to the outside.

The pump 71 is an electric pump whose degree of opening is adjustable. The pump 71 is provided in the middle of the pipe 76. Then, when the degree of opening is adjusted, the flow rate of the water flowing through the pipe 76 is adjusted.

The adjusting valve 72 is a solenoid valve whose degree of opening is adjustable. The adjusting valve 72 is provided in the middle of the pipe 77. Then, when the degree of opening is adjusted, the flow rate of the hydrogen flowing through the pipe 77 is adjusted.

The adjusting valve 73 is a solenoid valve whose degree of opening is adjustable. The adjusting valve 73 is provided in the middle of the pipe 78. Then, when the degree of opening is adjusted, the flow rate of the hydrogen flowing through the pipe 78 is adjusted. Here, the adjusting valves 72 and 73 may be valves capable of controlling only the opening and closing.

The control unit 74 includes a CPU and a memory and is electrically connected to the pressure gauge 65 as well as to the pump 71 and the adjusting valves 72 and 73. The control unit 74 controls the pump 71 in accordance with the pressure value measured by the pressure gauge 65. Specifically, when the pressure value received from the pressure gauge 65 goes up, the control unit 74 transmits a signal of instructing to reduce the flow rate of the water suctioned from the reaction and purification water tank 50 and then poured into the hydrogen generation container 60. When the pressure value goes down, the control unit 74 transmits to the pump 71 a signal of instructing to increase the flow rate of the water. Further, when a pressure value greater than or equal to a value set up in advance is received from the pressure gauge 65, the control unit 74 transmits to the pump 71 a signal of stopping suctioning of the water from the reaction and purification water tank 50.

Further, the control unit 74 controls the adjusting valve 72 in accordance with the pressure value measured by the pressure gauge 65. Specifically, when the pressure value received from the pressure gauge 65 goes up, the control unit 74 transmits to the adjusting valve 72 a signal of instructing to adjust the pressure in order to reduce the flow rate of water to be poured into the hydrogen generation container 60. Further, when the pressure value goes down, the control unit 74 transmits to the adjusting valve 72 a signal of instructing to increase the flow rate of hydrogen. Further, the control unit 74 controls the adjusting valve 73 similarly to the adjusting valve 72. Here, the control unit 74 may further include input means and thereby control the pump 71 and the adjusting valves 72 and 73 on the basis of information inputted by the user.

The power generator 75 includes a fuel cell and is connected to the pipe 78. The power generator 75 performs the electrochemical reaction by using the supplied hydrogen so as to generate electric power.

Operation of the hydrogen generation apparatus in the present embodiment is described below. The control unit 74 causes the pump 71 to operate so as to suction the water stored in the reaction and purification water tank 50 through the water supply pipe 53 and the pipe 76 and to inject the water through the water injection hole 63a into the magnesium-based hydride accommodation part 62. In the magnesium-based hydride accommodation part 62, the water injected through the water injection hole 63a and the accommodated magnesium-based hydride 67 perform the hydrolysis reaction of Formula (1).

The hydrogen generated by the hydrolysis reaction is sent through the side-part holes 62a, 62a, . . . to the outside of the magnesium-based hydride accommodation part 62 and then exhausted through the exhaust hole 61b. The hydrogen exhausted through the exhaust hole 61b is sent to the purification pipe 54 in a state that the flow rate is controlled by the adjusting valve 72.

Figure 13:
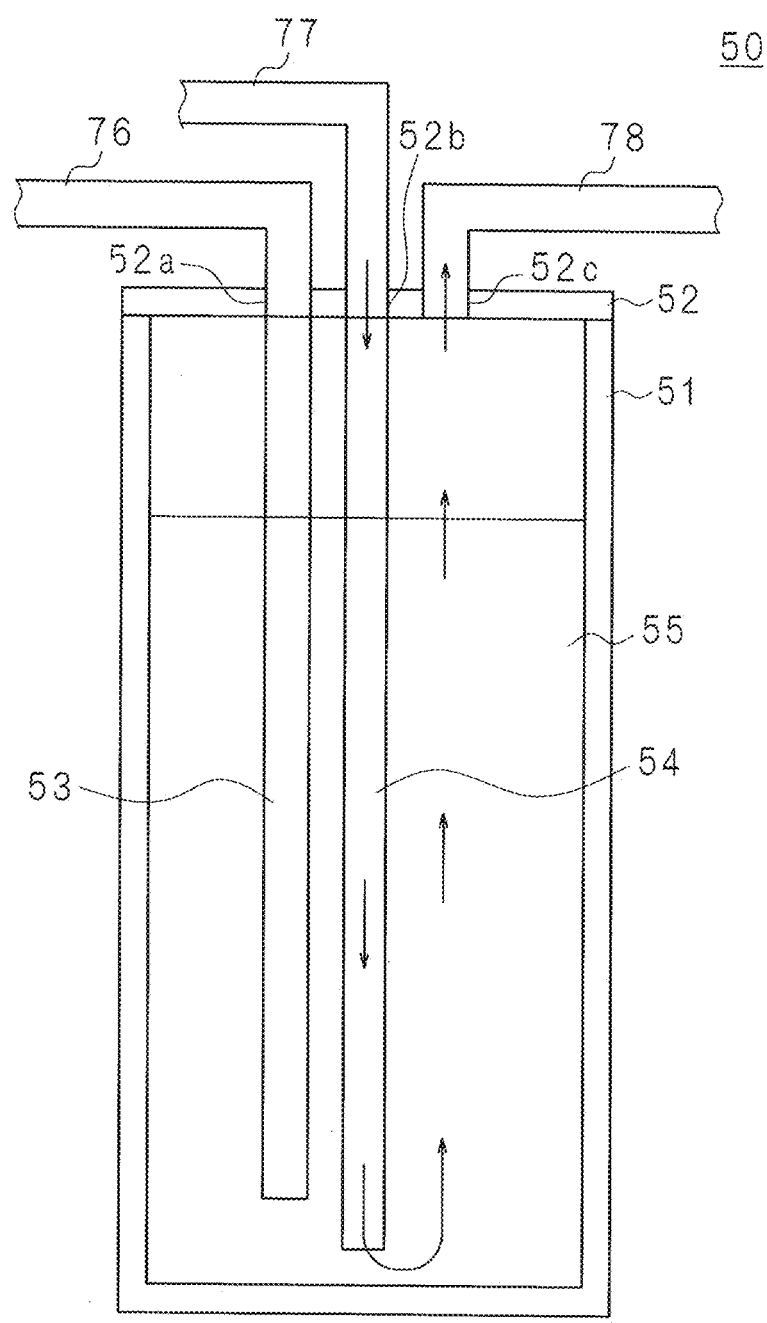
FIG. 13 is an explanation diagram illustrating the flow of hydrogen exhausted through a purification pipe.

FIG. 13 is an explanation diagram illustrating the flow of hydrogen sent through the purification pipe 54. An arrow indicates the flow of the hydrogen. The hydrogen exhausted through the exhaust hole 61b of the hydrogen generation container 60 is sent through the pipe 77 and the purification pipe 54 into the water 55 stored in the storage part 51. When the hydrogen goes through the water 55, impurities such as inorganic substances, organic substance, and particulates are removed so that the hydrogen is purified. The hydrogen purified through the water 55 is sent through the hole 52c.

In a state that the flow rate is controlled by the adjusting valve 73, the hydrogen sent through the hole 52c is sent through the pipe 78 to the power generator 75. The power generator 75 generates electric power by using the supplied hydrogen.

According to the present embodiment, the water 55 stored in the reaction and purification water tank 50 is used for the hydrolysis reaction as well as for purification of the generated hydrogen. By virtue of this, purified hydrogen is allowed to be generated in a state that the water 55 stored in the reaction and purification water tank 50 is used effectively.

Fifth Embodiment

A fifth embodiment is described below. The present embodiment relates to a mode that the hydrogen generation container and the reaction and the purification water tank are integrated with each other.

Figure 14:
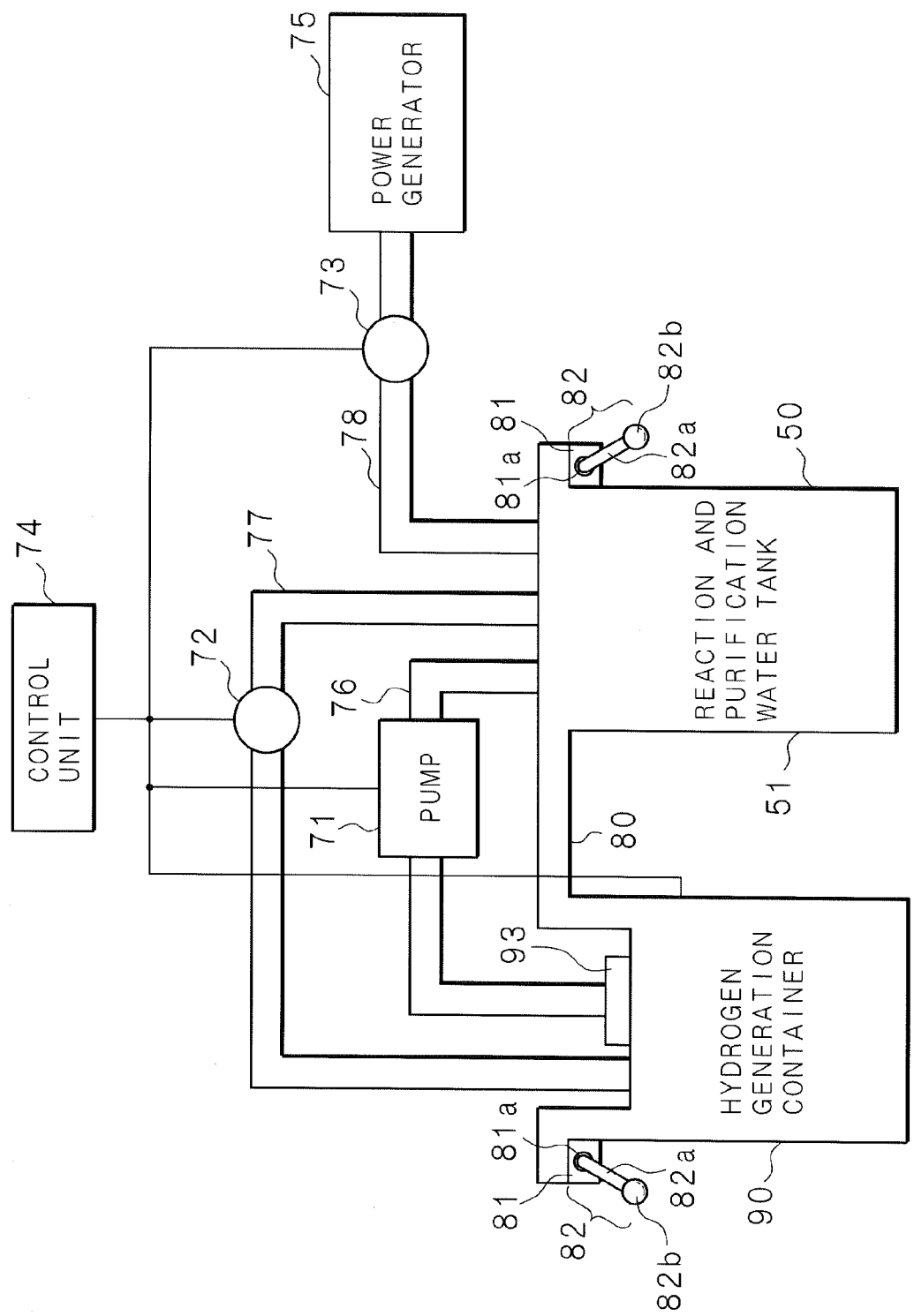
FIG. 14 is a schematic side view illustrating a hydrogen generation apparatus.

FIG. 14 is a schematic side view illustrating a hydrogen generation apparatus. The hydrogen generation apparatus in the present embodiment includes a joining part 80, a support part 81, and a grip part 82 in addition to the configuration of the fourth embodiment. Further, the hydrogen generation apparatus includes a hydrogen generation container 90 having a different configuration from the hydrogen generation container 60.

The joining part 80 has a flat plate shape and is fabricated from metal such as aluminum and stainless steel or from resin similarly to the reaction and purification water tank 50 and the hydrogen generation container 90. The side portion of the joining part 80 is joined to the side portion at the upper end of the storage part 51 of the reaction and purification water tank 50. Further, in the joining part 80, the side portion on the side opposite to the portion joined to the storage part 51 is joined to the side portion at the upper end of the hydrogen generation part 91. Here, in the present embodiment, the reaction and purification water tank 50 and the hydrogen generation container 90 are located at the same height and hence the joining part 80 extends horizontally.

The support part 81 is a member supporting the grip part 82. The support part 81 is provided at the upper edge of the outer side-surface of the storage part 51 on the side opposite to the portion joined to the joining part 80. A hole 81a is provided horizontally in the support part 81.

The grip part 82 is a member gripped by the user when the user carries the reaction and purification water tank 50 and the hydrogen generation container 90. The grip part 82 includes an annular part 82a and a spherical knob 82b penetrated by the annular part 82a. Further, the annular part 82a penetrates the hole 81a and is allowed to rotate about the hole 81a. Further, the support part 81 and the grip part 82 are provided also at a position at the upper edge of the outer side-surface of the hydrogen generation part 91 on the side opposite to the joined portion of the joining part 80.

Figure 15:
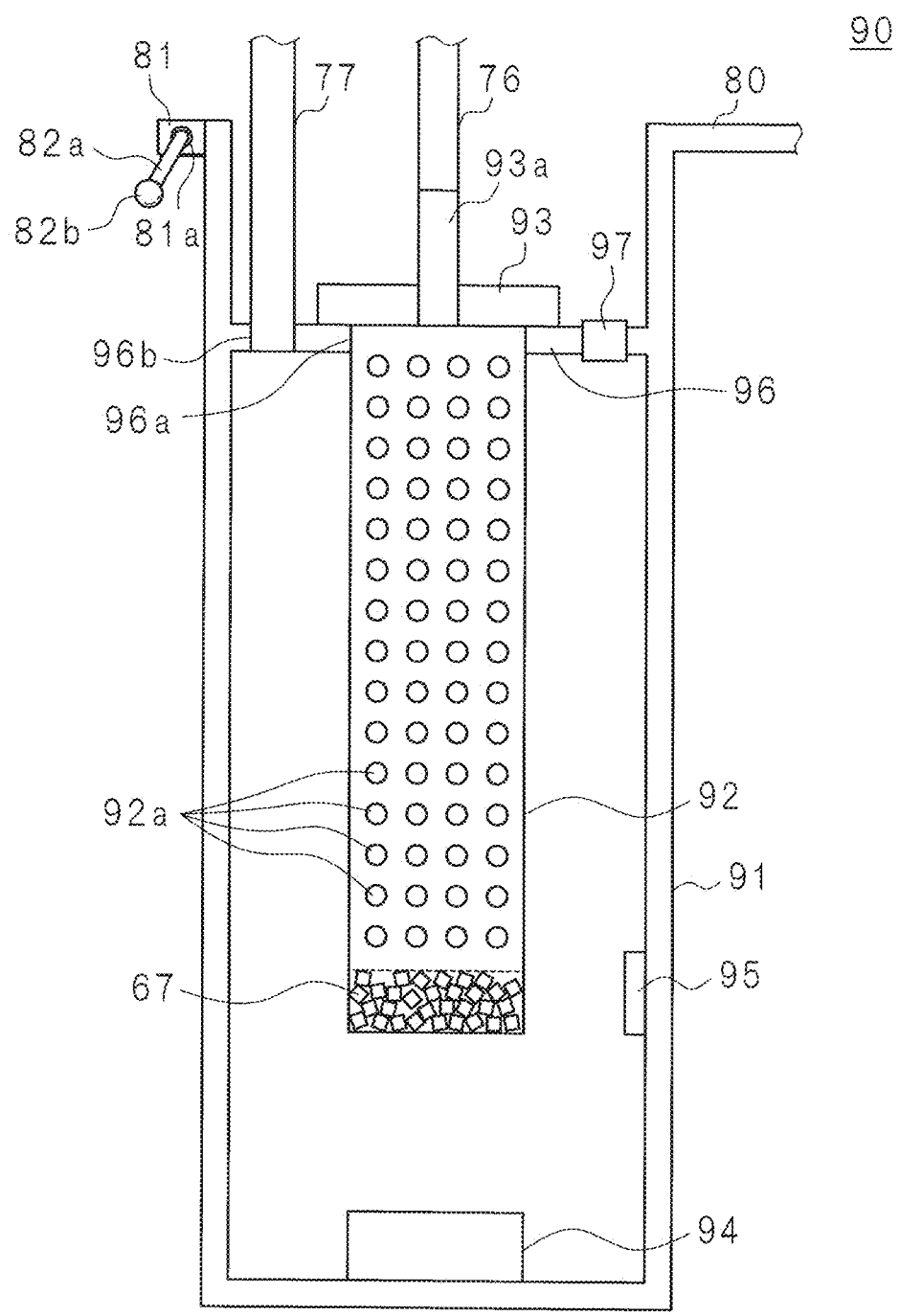
FIG. 15 is a schematic horizontal sectional view illustrating a hydrogen generation container.

The hydrogen generation container 90 is described below. FIG. 15 is a schematic sectional view illustrating the hydrogen generation container 90. The hydrogen generation container 90 includes a hydrogen generation part 91, a magnesium-based hydride accommodation part 92, a lid 93, absorbent 94, a pressure gauge 95, an annular part 96, and a safety valve 97. Here, the magnesium-based hydride accommodation part 92, the absorbent 94, the pressure gauge 95, and the safety valve 97 are similar to the magnesium-based hydride accommodation part 62, the absorbent 64, the pressure gauge 65, and the safety valve 66. Thus, their description is not given here.

The hydrogen generation part 91 is a container of closed-end cylindrical shape. Then, a part of the upper edge is joined to the joining part 80.

The annular part 96 has the shape of a disk joined without a gap along the surface of the inner wall of the hydrogen generation part 91 and is arranged in a horizontal orientation above the center in the height direction of the inside of the hydrogen generation part 91. In the annular part 96, a fitting hole 96a is provided in the center and a hydrogen exhaust hole 96b is provided around the fitting hole 96a. The magnesium-based hydride accommodation part 92 is fit in the fitting hole 96a. In the hydrogen exhaust hole 96b, the upper end is in the form of a socket and then joined to the pipe 77 without a gap.

The lid 93 has a disk shape whose diameter is larger than the magnesium-based hydride accommodation part 92 and the fitting hole 96a. Similarly to the fourth embodiment, the lid 93 is joined to the magnesium-based hydride accommodation part 92. The lid 93 is placed on the annular part 96 such that the periphery portion of the lower surface goes into contact with the upper surface of the annular part 96 near the fitting hole 96a. Further, the annular part 96 and the lid 93 are in close contact with each other without a gap by screwing or the like. By virtue of this, the magnesium-based hydride accommodation part 92 having been fit in the fitting hole 96a is arranged in a state of being hung in the inside of the hydrogen generation part 91 by the annular part 96.

In the lid 93, a tube part 93a extending outward in the height direction of the hydrogen generation container 90 is provided in the center. The tube part 93a has such a length that the upper end is located at the same height as or, alternatively, slightly lower than the upper end of the hydrogen generation part 91. Then, the tube part 93a is joined to the pipe 76. Further, the hole provided in the tube part 93a goes through the lid 93 also.

For example, in case of a disaster, immediate power generation is required regardless of the site in some cases. In such cases, a hydrogen generation apparatus should be carried. Then, according to the present embodiment, the reaction and purification water tank 50 and the hydrogen generation container 90 are integrated with each other and hence carrying is easy. Thus, power generation becomes easy regardless of the site.

Sixth Embodiment

A sixth embodiment is described below. The sixth embodiment relates to a mode that the hydrogen generation container is to be gripped.

Figure 16:
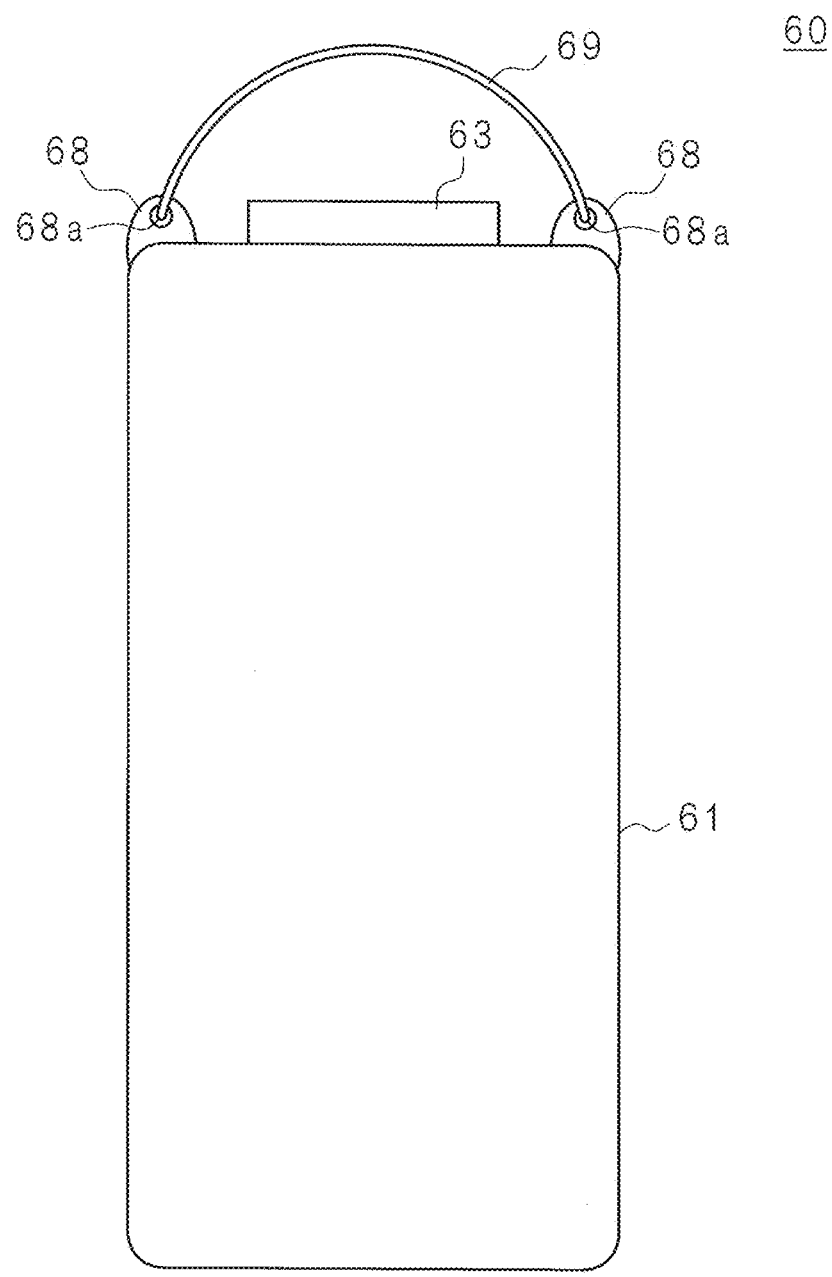
FIG. 16 is a schematic side view illustrating a hydrogen generation container.

FIG. 16 is a schematic side view illustrating the hydrogen generation container 60. The hydrogen generation container 60 in the present embodiment includes a support part 68 and a grip part 69 in addition to the configuration of the fourth embodiment.

The support part 68 is a member supporting the grip part 69. Two support parts 68 and 68 are provided at positions on the opposite sides to each other in the periphery of the upper end of the outer surface of the hydrogen generation part 61. Holes 68a and 68a are provided respectively in the support parts 68 and 68.

The grip part 69 is a member gripped by the user when the user carries the hydrogen generation container 60. The grip part 69 has an arc shape whose diameter of the entirety is larger than the outer diameter of the hydrogen generation part 61. Further, in the grip part 69, both ends are formed annular and the annular parts at both ends respectively penetrate the holes 68a and 68a. Thus, the grip part 69 is allowed to rotate about the holes 68a and 68a. The support parts 68 and 68 and the grip part 69 are fabricated from metal such as aluminum and stainless steel or from resin and do not have flexibility. Further, similarly to the fifth embodiment, a knob may be provided in the middle of the grip part 69.

According to the present embodiment, when the user grips the grip part 69, carrying of the hydrogen generation container 60 becomes easy. Thus, for example, the work of refilling of the magnesium-based hydride 67 accommodated in the magnesium-based hydride accommodation part 62 or of removing water accumulated in the hydrogen generation part 61 becomes easy.

The embodiments disclosed here are to be regarded as illustrative and not restrictive at all points. The scope of the present invention is defined not by the meaning given above but by the scope of the claim. Further, all changes within the meaning and the scope equivalent to the scope of the claim are intended to be included. Further, the technical features described in each embodiment are allowed to be combined to each other. Then, when they are combined, a new technical feature is allowed to be formed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A hydrogen generation apparatus, comprising:
   a hydrogen generation container including an inner container whose upper side is opened for accommodating magnesium-based hydride and an outer container covering the inner container, the outer container being provided with a liquid injection hole which is arranged above the inner container;
   a liquid tank storing liquid that is water or an aqueous solution containing any one of an acidic and alkaline substance;
   a first pipe connected to the liquid tank and the liquid injection hole;
   a pump configured to suction the liquid from the liquid tank and then pour the liquid through the first pipe into the liquid injection hole so as to generate hydrogen by supplying the magnesium-based hydride with the liquid;
   a pressure gauge measuring a pressure inside of the outer container;
   a control unit configured to control the pump; and a hydrogen storage container storing hydrogen, wherein the outer container is provided with an exhaust hole exhausting generated hydrogen, the control unit controls the amount of the liquid to flow through the first pipe by the pump on the basis of the pressure value of the pressure gauge, the hydrogen storage container stores hydrogen exhausted through the exhaust hole, and wherein the hydrogen storage container comprises:
  a movable hydrogen storage part;
  a sealed container in the inside of which the hydrogen storage part is provided, wherein a space is present between the hydrogen storage part and the sealed container;
  an on-off valve provided in the outside of the sealed container and connected to the hydrogen storage part;
  a supply pipe that penetrates the sealed container;
  an inert gas in the space between the hydrogen storage part and the sealed container, wherein the pressure of the inert gas can be set such that the entirety of the hydrogen in the movable part is exhausted; and
  an on-off valve opening and closing the supply pipe.

2. The hydrogen generation apparatus according to claim 1, further comprising a temperature adjustment part configured to adjust a temperature of the hydrogen generation container.

3. The hydrogen generation apparatus according to claim 2, wherein the temperature adjustment part includes:
  a coolant storage container including a flowing passage through which liquid coolant flows and covering the outer container; and
  a thermometer measuring the temperature of the hydrogen generation container, and wherein
  the control unit controls the amount of the liquid coolant to be stored in the coolant storage container on the basis of the temperature measured by the thermometer.

4. The hydrogen generation apparatus according to claim 2, wherein the temperature adjustment part includes:
  an air blow unit blowing air to the hydrogen generation container; and
  a thermometer measuring the temperature of the hydrogen generation container, and wherein
  the control unit controls an air flow rate of the air blow unit on the basis of the temperature measured by the thermometer.

5. The hydrogen generation apparatus according to claim 1, further comprising:
  a second pipe connected to the exhaust hole, wherein
  the liquid tank has a box shape and is provided with a hydrogen pipe which is provided in the inside of the liquid tank and is joined to a lid of the liquid tank,
  one end of the hydrogen pipe is connected to the second pipe, and
  the other end of the hydrogen pipe is arranged near an inner bottom surface of the liquid tank.

6. The hydrogen generation apparatus according to claim 1, wherein the inner container has a closed-end tubular shape and is provided with a mesh part or a plurality of holes formed in a side part thereof.

7. The hydrogen generation apparatus according to claim 1, wherein the hydrogen storage part comprises an expandable and contractible rubber or resin.

8. A hydrogen generation apparatus, comprising:
  a hydrogen generation container including an inner container whose upper side is opened for accommodating magnesium-based hydride and an outer container covering the inner container, the outer container being provided with a liquid injection hole which is arranged above the inner container;
  a liquid tank storing liquid that is water or an aqueous solution containing any one of an acidic and alkaline substance;
  a first pipe connected to the liquid tank and the liquid injection hole;
  a pump configured to suction the liquid from the liquid tank and then pour the liquid through the first pipe into the liquid injection hole so as to generate hydrogen by supplying the magnesium-based hydride with the liquid;
  a pressure gauge measuring a pressure inside of the outer container;
  a control unit configured to control the pump; and
  a second pipe, wherein
  the outer container is provided with an exhaust hole exhausting generated hydrogen,
  the control unit controls the amount of the liquid to flow through the first pipe by the pump on the basis of the pressure value of the pressure gauge,
  the second pipe is connected to the exhaust hole, and wherein
  the liquid tank has a box shape and is provided with a hydrogen pipe which is provided in the inside of the liquid tank and is joined to a lid of the liquid tank,
  one end of the hydrogen pipe is connected to the second pipe, and
  the other end of the hydrogen pipe is arranged near an inner bottom surface of the liquid tank; and a third pipe connected to the liquid tank to supply hydrogen to the outside of the liquid tank.

9. The hydrogen generation apparatus according to claim 8, further comprising a temperature adjustment part configured to adjust a temperature of the hydrogen generation container.

10. The hydrogen generation apparatus according to claim 9, wherein
  the temperature adjustment part includes:
    a coolant storage container including a flowing passage through which liquid coolant flows and covering the outer container; and
    a thermometer measuring the temperature of the hydrogen generation container, and wherein
    the control unit controls the amount of the liquid coolant to be stored in the coolant storage container on the basis of the temperature measured by the thermometer.

11. The hydrogen generation apparatus according to claim 9, wherein
  the temperature adjustment part includes:
    an air blow unit blowing air to the hydrogen generation container; and
    a thermometer measuring the temperature of the hydrogen generation container, and wherein
    the control unit controls an air flow rate of the air blow unit on the basis of the temperature measured by the thermometer.

12. The hydrogen generation apparatus according to claim 8, wherein the inner container has a closed-end tubular shape and is provided with a mesh part or a plurality of holes formed in a side part thereof.

* * * * *